(12) United States Patent
Hazel et al.

(10) Patent No.: US 11,797,485 B2
(45) Date of Patent: *Oct. 24, 2023

(54) FRAMEWORKS FOR DATA SOURCE REPRESENTATION AND COMPRESSION

(71) Applicant: CHAOSSEARCH, INC., Boston, MA (US)

(72) Inventors: Thomas Hazel, Boston, MA (US); Gerard Buteau, Durham, NH (US)

(73) Assignee: CHAOSSEARCH, INC., Boston, MA (US)

( * ) Notice: Subject to any disclaimer, the term of this patent is extended or adjusted under 35 U.S.C. 154(b) by 340 days.

This patent is subject to a terminal disclaimer.

(21) Appl. No.: 17/069,790

(22) Filed: Oct. 13, 2020

(65) Prior Publication Data

US 2022/0114144 A1    Apr. 14, 2022

(51) Int. Cl.
*G06F 16/17*    (2019.01)
*G06F 16/174*    (2019.01)
*G06F 16/13*    (2019.01)

(52) U.S. Cl.
CPC ........ *G06F 16/1744* (2019.01); *G06F 16/137* (2019.01)

(58) Field of Classification Search
CPC ..... G06F 16/1744; G06F 16/137; G06F 16/13
See application file for complete search history.

(56) References Cited

U.S. PATENT DOCUMENTS

| 5,129,082 A * | 7/1992 | Tirfing | G06F 16/10 |
| 2005/0203876 A1 * | 9/2005 | Cragun | G06F 16/221 |
| 2008/0152235 A1 * | 6/2008 | Bashyam | H03M 7/4018 |
| | | | 382/224 |
| 2009/0234818 A1 * | 9/2009 | Lobo | G06F 16/93 |
| 2012/0221534 A1 * | 8/2012 | Gao | G06F 16/40 |
| | | | 707/696 |
| 2014/0258249 A1 * | 9/2014 | Ozturk | G06F 16/1744 |
| | | | 707/693 |
| 2016/0098451 A1 * | 4/2016 | Dickie | G06F 16/2465 |
| | | | 707/718 |

(Continued)

FOREIGN PATENT DOCUMENTS

| EP | 0924628 A2 | 6/1999 |
| EP | 0924628 A3 | 8/2005 |

OTHER PUBLICATIONS

International Search Report and Written Opinion corresponding to International Application No. PCT/US2021/054616, dated Jan. 31, 2022 (dated Jan. 31, 2022), 13 pages.

(Continued)

*Primary Examiner* — Pierre M Vital
*Assistant Examiner* — Andrew N Ho
(74) *Attorney, Agent, or Firm* — Procopio, Cory, Hargreaves & Savitch LLP

(57) ABSTRACT

Apparatus, methods, and computer-readable media for providing frameworks for data source representation and compression using an index file format are disclosed herein. The index file format separate information about symbols in a data file and information about the corresponding location of those symbols in the data file. The described techniques provide mechanisms for reducing the size associated with the representation of the symbols information and/or the size associated with the representation of the location information.

26 Claims, 12 Drawing Sheets

(56) References Cited

U.S. PATENT DOCUMENTS

2018/0089224 A1* 3/2018 Muthuswamy ......... G06F 16/13
2019/0266170 A1 8/2019 Hazel et al.

OTHER PUBLICATIONS

International Preliminary Report on Patentability corresponding to International Application PCT/US2021/054616 dated Apr. 13, 2023 (6 pages).

* cited by examiner

FRAMEWORKS FOR DATA SOURCE REPRESENTATION AND COMPRESSION

FIELD OF TECHNOLOGY

The present disclosure relates generally to the field of information compression, and more particularly, to frameworks for data source representation and compression.

BACKGROUND

Object storage is a type of data storage architecture that manages data as objects, which has become popular due to its prevalence in cloud storage services. Object storage may be considered a form of a distributed key/value storage service, where keys (unique indexes) and values (opaque data) is accessed via PUT, GET, and LIST interfaces. Consequently, such data is copied out to do a variety of processing and/or analysis, where the results of this external execution is often put right back into object storage. The cycle of Extracting, Transforming, and Loading (ETL) data is a large part of the data storage and management problem, though not the only issue. The advantages of object storage is its simplicity and scalability, encouraging cloud based storage services to be used as data lake repositories, where any type of data of any scale can be stored with the belief that value can be derived at a later date. However, this can lead to data being stored in a disjoined, disparate, and schema-less manner. Frequently, this unstructured data is irregular, malformed, and chaotic, which is a direct result of object storage constructs.

Knowing what has been stored in object storage (e.g., "what is in your buckets") is another issue. In other words, understanding "what" to extract and "how" to extract information from stored data it is a major step before any type of ETL operation can be performed. The ability to group information into "like" subsets is important to efficiently use object storage. However, once this information has been identified, the actual data analysis is yet another significant hurdle to overcome. Analysis of such disjoined, disparate, or malformed data traditionally requires either manual inspection via scaffolding such as via Hadoop™ (raw data) or manual transformation for analytic services such as Amazon Redshift™ (tabular data) and/or Elastic™ (text data). Whether manual inspection or transformation, each is time consuming, complicated, and costly, and may contribute to the failures of "data lakes."

SUMMARY

Aspects presented herein provide solutions to these problems, enabling such functionality to be embedded directly into object storage and, thus, making object storage smarter and more capable. Aspects include a data format for universally representing any data source, with all its potential irregularities, e.g., everything from text based files such as Text, JSON, and CSV to image files such as PNG and JPG, and/or video files such as MPEG, AVI etc., so that the data can be virtually transformed and aggregated without considerable computation, while still providing built-in support for both relational queries and text searches. The data format can be manipulated without algorithmic execution and retrieve results at the speed of classic analytic solutions. The data format not only does not increase the actual storage footprint, but may actually decrease it. The data format may be configured to intrinsically describe itself such that it can be exported into other data formats without unnecessary conversion. Aspects of the data format may be referred to herein as "chaos index," "chaos indexing," "data edge," "data edging," as "indexing based on a symbol file and a locality file" or "indexing based on a separation of information about symbols and locality," etc.

The indexing provided herein provides an ability to discover and organize data generically and concurrently, an ability to organize and represent data consistently and uniformly, an ability to compress and catalogue data to theoretical minimums, and an ability to query and analyze data without Extract, Transform, Load. The disclosed indexing comprises a storage format where any processing algorithm can be applied to create, organize, and retrieve information.

The indexing provided herein involves separating the symbols of a file from the symbols' location within the file. The indexing may be referred to as indexing based on a symbol file and a locality file or based on a separation of information about symbols and locality. Compression technology may then use the symbol and location of the symbol as part of its algorithm and representation. Among others, symbols within a file may be, for example, words, images, numbers, data, and time types, etc. For example, a document may comprise words (e.g., symbols) placed at particular locations (e.g., "locality") in a source file that should be reconstituted in a lossless approach. By separating the symbols and locations of the symbols, data may be organized and compressed to its optimal state. In contrast, mixing the symbols and the locations of the symbols limits what any given compression algorithm can achieve. Symbols and locality of the symbols are not "like" entities and, thus, cannot be reduced easily. The index format also includes a descriptive "manifest" incorporated into the indexed data source that is used to map together interrelated symbol and locality segments, as well as provide descriptive indicators of how the underlying data is transformed or normalized into an index.

According to one aspect of the present disclosure, a method of storing a file in object storage is provided. The example method includes receiving, from an object storage system, a source file having data. The example method also includes generating a symbol file associated with the source file and comprising a sorted unique set of symbols from the source file, where each of the symbols is stored at a corresponding location with the symbol file. Additionally, the example method includes generating a locality file associated with the source file and comprising a plurality of location values referencing the symbol file, where a location value at a respective position within the locality file represents an occurrence in the source file of a corresponding symbol identified by the respective location value. The example method also includes augmenting at least one of the symbol file or the locality file, where augmenting the locating file includes reducing a representation of a location value in the locality file and augmenting the symbol file includes reducing a representation of a symbol in the symbol file.

In another example aspect, a computer apparatus for storing a file in object storage is provided. The example computer apparatus includes memory and at least one processor coupled to the memory. The at least one processor is configured to receive, from an object storage system, a source file having data. The at least one processor is also configured to generate a symbol file associated with the source file and comprising a sorted unique set of symbols from the source file, where each of the symbols is stored at a corresponding location with the symbol file. Additionally, the example at least one processor is configured to generate a locality file associated with the source file and comprising a plurality of location values referencing the symbol file, where a location value at a respective position within the locality file represents an occurrence in the source file of a corresponding symbol identified by the respective location value. The example at least one processor is also configured to augment at least one of the symbol file or the locality file, where augmenting the locating file includes reducing a representation of a location value in the locality file and augmenting the symbol file includes reducing a representation of a symbol in the symbol file.

According to another example aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method, and computer program product for processing and analyzing data stored in object storage. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
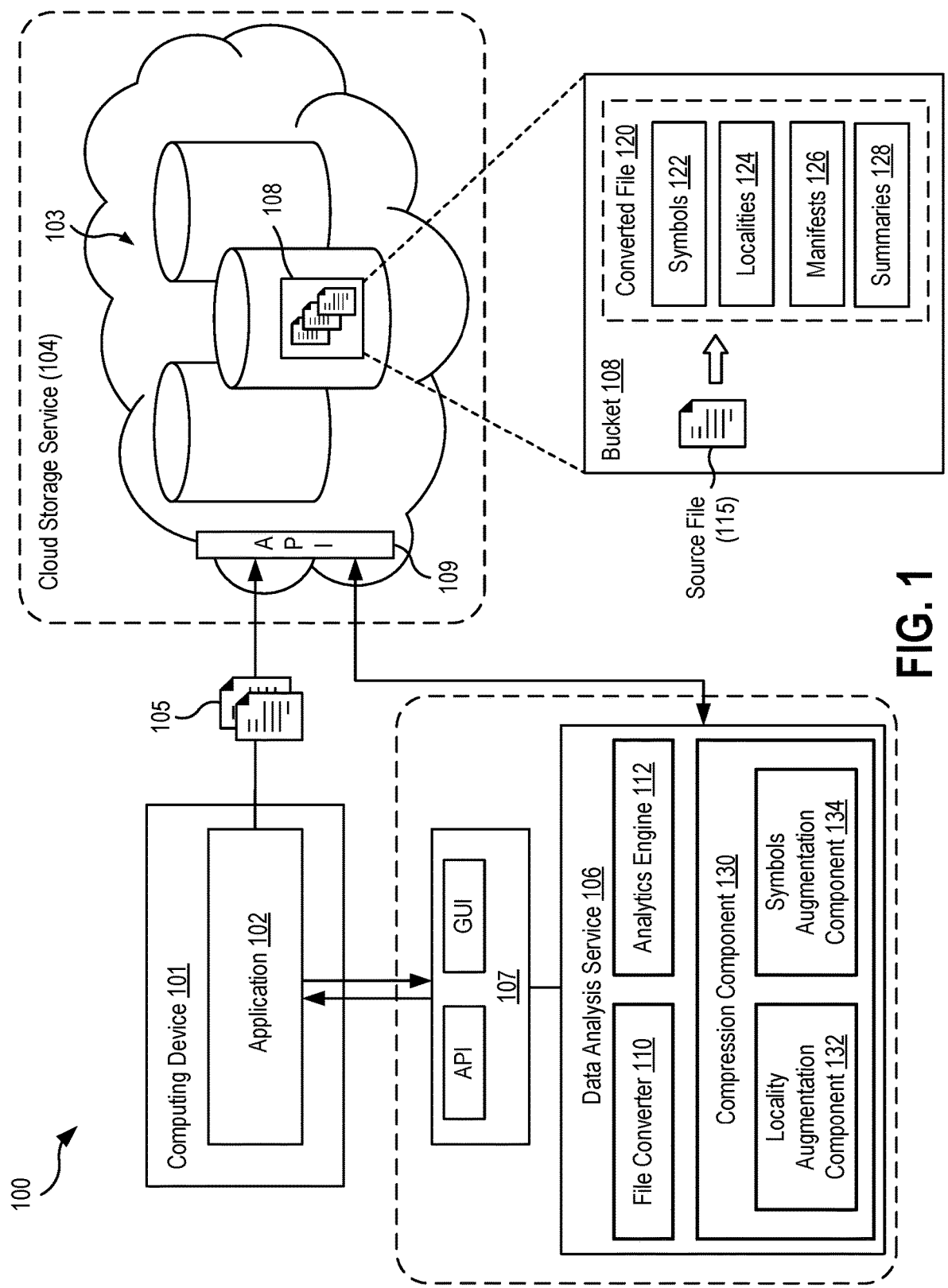
FIG. 1 is a block diagram illustrating a system for processing and analyzing data stored in object storage, in accordance with various aspects of the present disclosure.

FIG. 1 is a block diagram illustrating a system 100 for processing and analyzing data stored in object storage, in accordance with aspects presented herein. The system 100 includes a computing device 101 executing an application 102 that is configured to store data 105 in an object storage system 103. In the illustrated example, the object storage system 103 may be provided by a cloud storage service 104. In some examples, the application 102 may have a multi-tier software architecture in which user data of the application is stored in a data layer in the object storage system 103. The application 102 may be configured to store, retrieve, modify, and/or access data in the object storage system 103 via an application programming interface 109 (API), REST-based interface (e.g., using PUT, GET, LIST operations), or other interfaces exposed by the cloud storage service 104.

The object storage system 103 (sometimes referred to as "object-based storage") may include one or more storage devices configured to provide a data storage architecture that manages data 105 as objects, in contrast to a file system-based storage architecture (which manages data in a file hierarchy) or a block-based storage architecture (which manages data as blocks within sectors and tracks of physical media). Examples of object storage include object-based storage provided by such cloud storage services as AWS Simple Storage Service (S3)™ made available by Amazon, Microsoft Azure Storage™, or Google Cloud Storage™. While discussed in the context of public cloud services, it is understood that aspects of the present disclosure may also be applied to "on premise" or private object-based storage systems.

The object storage system 103 is configured to store units of data 105 as "objects" (also referred to as "blobs" in some architectures), and to map each object to a unique identifier (e.g., key, index, object name). For clarity of explanation, the data 105 stored in object storage is interchangeably referred to as "files" in the present disclosure. The object storage system 103 may have a flat hierarchy and include a plurality of buckets 108, which may be logical containers for holding the data 105. That is, each object is stored in a particular bucket 108.

The data stored in the object storage system 103 may represent one or more computer files having a variety of file formats and types of data, including text data, binary data, log files, program data files, CSV (comma-separated values) files, XML files, JSON (JavaScript Object Notation) files, image files, audio files, and video files. The data 105 in object storage may be characterized as structured data, unstructured data, or semi-structured data. A structured data file includes data arranged and organized according to a formal data model, such as the row-and-column structure of relational databases or data tables (e.g., CSV files). While not conforming to some formal structure of data model, a semi-structured data file may include data that is organized or annotated according to some pre-defined manner, for example, data that contains tags, markers, and other syntax that separate semantic elements and assign attributes and a hierarchy to the data (e.g., XML, JSON files). An unstructured data file refers to data that lacks a pre-defined data model and is not organized in a pre-defined manner, such as data found in text-heavy files.

Typically, an application 102 may store an amorphous mix (structured data, semi-structured data, and/or unstructured data) of bulk data in the object storage system 103, resulting in data being stored in a disjointed, disparate, and scheme-less manner. In some examples, the buckets 108 might expose structure by virtue of keys and their associated object or blob. As such, from the point of view of a user, the objects stored in the object storage system 103 may conform to some unspecified structure that is unknown, unless the user downloads and manually inspects the objects.

According to aspects of the present disclosure, the system 100 includes a data analysis service 106 configured to process and analyze the data 105 stored in the object storage system 103. In some examples, the data analysis service 106 may be configured to process files already stored in object storage, for example, all files contained in a selected bucket 108. In some examples, the application 102 may store data 105 in object storage using the data analysis service 106 as an intermediary, which in turn converts the data 105 into index files stored in object storage.

In some examples, the data analysis service 106 may be a distributed server application executing on one or more computing devices. The data analysis service 106 may include an interface 107 that enables the application 102 to discover, refine, and/or query the data 105 it has stored within its buckets 108 in the object storage system 103. In some examples, the interface 107 may be an API of the data analysis service 106 configured to provide the application 102 programmatic access to the functionality of the data analysis service 106 in relation to the data 105. In some examples, the API of the data analysis service 106 may be configured to extend or override (i.e., "wrap") the API interface provided by the cloud storage service 104. In some examples, the interface 107 of the data analysis service 106 may be a command-line or graphical user interface (GUI) of a server-based application that enables a user to interactively discover, refine, and/or query the data 105 stored within object storage.

In the illustrated example of FIG. 1, the data analysis service 106 includes a file converter 110 configured to convert data in object storage to a specialized file format, referred to herein as an index file format based on a symbol file and a locality file (which may be referred to as "chaos indexing" in some examples), that enables the data analysis service 106 to discover, refine, and/or query the object storage data. The index file format further allows improved compression of the data stored in object storage based on the separation of symbols from their location. The index file format models data sources in an edge space representation that may be analyzed via complex mathematical algorithms, such as linear algebra computation.

The data analysis service 106 further includes an analytics engine 112 configured to analyze one or more index file(s) 120 and generate statistical information (e.g., a manifest 126) based on the data contained in the index files 120. The analytics engine 112 may be configured to perform "in-place" normalization, aggregation, and correlation in which the statistics and manipulation of the data source is within the storage layer itself (i.e., object storage). In some examples, the analytics engine 112 may be configured to perform relevant cleansing and preparation functionality by manipulating index files' locality file(s) in object storage. This is performed with less memory, at larger scale, and with greater speed than existing tooling, which may use separate data warehousing to perform ETL and analysis.

In some examples, the analytics engine 112 may be configured to collect statistics related to the data in the index files 120, and use these statistics to both "fill in" or "remove" irregular shapes in response to a user request received from the interface 107 (e.g., API or GUI) or in an automated manner. The analytics engine 112 may manipulate the index locality to normalize data sets based on analytics needs by performing one or more of the following functions: insert row or column; delete row or column; copy row or column; merge row or column; update symbol for cell (i.e., field); extract symbol from cell (i.e., field); split row/column matrix; join row/column matrix; provide stats (function) of column. In some examples, these functions can be driven by a REST-based API (e.g., the interface 107) that can be driven from a command line interface and at scale. The REST-based API can be accessed via any programming language. In some examples, the normalization operations may be specified using functional or scripting language, such as "for Column 6, fill empty slots with the median value of that column." In some examples, the normalization operations may be specified interactively using a GUI.

The data analysis service 106 may process data 105 in object storage in a manner that separates the symbols of a file from their location in the file. In one aspect, the data analysis service 106 may be configured to, given a source file 115 of data, generate a converted file 120 (e.g., an index file) organized into: (1) a symbol portion 122 (sometimes referred to as a "symbol file") containing the symbols of the source file 115, and (2) a locality portion 124 (sometimes referred to as a "locality file") containing values representing the respective locations of those symbols in the source file 115. In some aspects, the data analysis service 106 may create two files from the source file 115: a symbol file (e.g., "filename.I2S", containing the symbol portion 122) and a locality file (e.g., "filename.L2I", containing the locality portion 124). In some examples, the symbol file and the locality file may be concatenated into one file (e.g., after it is compressed), and in other cases, the symbol file and the locality file may be maintained separately. In some examples, the converted file 120 may further include a manifest portion 126 (e.g., "filename.MDS") that contains metrics, statistics, and/or other metadata related to the original data 105, to the index file 120, and to the conversion process performed.

The manifest portion 126 (sometimes referred to as a "manifest file") contains schema information, statistics, metrics, and other metadata related to the original data source(s), to the index, and to the indexing processing performed. The symbol portions 122 contain all the symbols found in a data source file (e.g., ordered internally). The locality portions 124 contain values representing the respective locations of those symbols in the original data sources (i.e., raw/refined source). The combination of the manifest, source, and/or locality files can be used to normalize the data from the data sources files to eliminate redundant data, minimize anomalies, fill in missing or incomplete data, and provide statistics that can be used to more efficiently resolve certain types of search queries on the original data sources.

During the indexing process, a root and branch type data structure can be generated to summarize multiple manifest files of a single data edge index, such that several manifest files are combined or summarized into branch nodes. For example, the analytics engine 112 may be configured to create one or more summary files 128 ("SUM files") that collect and aggregate all manifest files 126 such that the summary files 128 may be interpreted as a "root" of datasets comprising multiple locality, symbol, and manifest segments (e.g., chunks). The summary file(s) 128 may summarize portions of the manifest for faster access and query execution. In an aspect, for each logical index, there may be a root summary file 128 that describes the topology of the dataset. Manifest files 126 can be summarized and reference other "branch" manifest files, which can represent an amount of raw data up to a threshold limit (e.g., 100 GB). These manifest files are configured to scope requests to resolve a particular search and/or query. In other words, the manifest files may be used to determine whether a particular symbol and locality file pair (e.g., the "leaves" of the "branch" manifest file) does not have information related to a specific request. The use of such summary files 128 and manifest files 126 greatly reduces the number of object storage system access requests that the data analysis service 106 needs to materialize a result.

Data compression techniques generally involve encoding some data using fewer bits than its original representation by finding patterns and eliminating redundancy. Consider the simple example of a data source file containing one hundred symbols, in which all symbols are the word "cat." A compressed version of this example data source file may encode this file as "100cat" to eliminate the redundant instances of the symbol "cat," resulting in a data reduction of 300 units of information to 6 units. Data compression algorithms attempt to find common symbols within symbols, as well as sequences represented in a form smaller than its original representation. In another example, a sequence of numbers from one to a million could be represented as "1ToMillion," with a saving factor of 6 times. It has been determined that as the source file gets larger, it becomes more difficult for a compression algorithm to find common or redundant patterns. Accordingly, the format of the index file is configured to organize symbols in a manner that facilitates more efficient data compression.

The data analysis service 106 further includes a compression component 130 configured to apply compression techniques disclosed herein to achieve improvements in performance and to achieve even greater reductions in size. The compression component 130 may be configured to apply a compression algorithm to the symbols portion 122 and/or the localities portion 124 of the converted file 120. In some examples, the compression component 130 may be configured to augment the symbols portion 122 and/or the localities portion 124 to achieve even greater reductions in size and to achieve improvements in performance while still using RLE compression algorithms to perform data compression of the respective files. Additionally, the disclosed techniques also support lossless compression.

In some examples, disclosed techniques may be configured to perform augmentations on the source data during conversion to the converted file by making the offset positions in the locality file in a column-based orientation. For example, a localities augmentation component 132 may be configured to locate the first symbol in each column in the symbol file at a new offset position of "0." As a result, the offset position of symbols in subsequent rows of a column may be smaller values, resulting in a reduction of number space within the locality file.

In some examples, to further improve the compression ratio of a locality file, disclosed techniques may apply a shuffle filter algorithm on each column of the locality file before performing the RLE compression algorithm (or other compression algorithm). The shuffle filter algorithm may reduce randomness of logical values within each column of the locality file. In some examples, the locality augmentation component 132 may be configured to input the initial location values into a shuffle filter algorithm (e.g., elements in rows and bit columns) to reduce the byte randomness of the location values. When attempting to reproduce the initial location values after the shuffle filter algorithm is applied, a reverse shuffle algorithm may be applied to the shuffled location values.

In some examples, disclosed techniques may facilitate reducing the number of characters used to represent a symbol. For example, a symbols augmentation component 134 may be configured to reduce the size of representing symbols in the symbol file, by employing a sliding window (or dictionary) coder to represent the symbols. For example, rather than using traditional-style dictionaries (e.g., a Huffman dictionary) that may achieve their known size reduction abilities due to more processor intensive compression algorithms, the symbols augmentation component 134 may be configured to embed information corresponding to the symbols in-line and into the streamed representation of the symbols. That is, the symbols augmentation component 134 may be configured to utilize a reference-based (or delta-based) representation of the symbols.

The following discussion provides detailed examples of converting source files of a variety of data types, including structured data (FIG. 2), such as CSV files, unstructured data (FIG. 4), such as text data, and structured data with text values (FIG. 5), and semi-structured data (FIG. 6), such as JSON and XML, files. Aspects of the present disclosure further provide examples of a column-based orientation for the locality file (FIG. 8), a shuffled byte representation of location values (FIG. 9), and a reference-based representation of symbols in a symbol file (FIG. 10).

Figure 2:
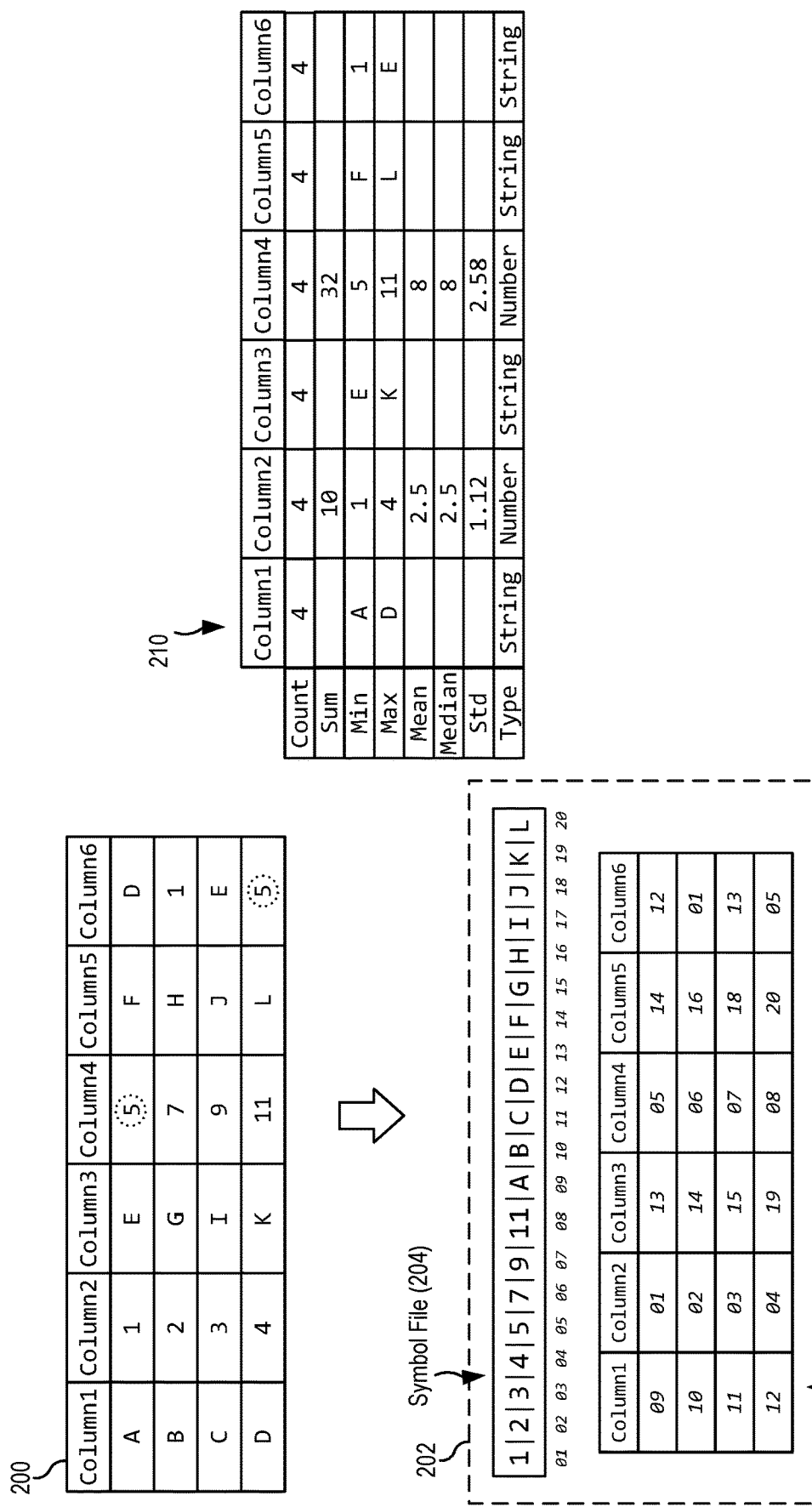
FIG. 2 is a block diagram depicting a structured data source file and a corresponding converted index file, in accordance with various aspects of the present disclosure.

FIG. 2 is a block diagram depicting a structured data source file 200 and a corresponding converted index file 202, in accordance with aspects presented herein. The source file 200 contains structured data having a plurality of records organized into rows and columns. For example, the source file 200 contains values having symbols (e.g., "A," "1," "E," "5," "F," "D," etc.) arranged in a 4-row by 6-column table format (the row containing column names "Column1", "Column2", etc. is omitted from this discussion). The structured data source file 200 is rendered in FIG. 2 in a table format for sake of illustration, but it is understood that the structured data may be encoded in a variety of formats. For example, the source file 200 may be a delimiter-separated file (such as a CSV file) containing a plurality of records (i.e., lines), where each record is comprised fields separated by a delimiter (e.g., a comma). In another example, the structured data source file 200 may be a log file containing a plurality of log entries, for example, separated by a tab or whitespace character.

The file converter 110 may create a symbol file 204 associated with the source file that contains each unique symbol found in the source file 200. In some examples, the file converter 110 may perform an initial reduction of the source file 200. For example, the file converter 110 may find and remove duplications and/or may find and order sequences. In some examples, the file converter 110 may scan through the source file 200, identifying each unique symbol contained in the source file 200, order each identified unique symbol, and disregard any duplicate symbols. For example, the file converter 110 may identify that the source file 200 contains a duplicate symbol "5" in both the first row, fourth column, as well as the fourth row, sixth column (highlighted by dashed circles). In some such examples, the file converter 110 may include a single instance of the symbol "5" in the resulting symbol file 204.

In some examples, the file converter 110 may represent symbols as "Strings" type. In some examples, the file converter 110 may determine that it may be more efficient to convert one or more symbols from the source file 200 into a different data type, such as a number or a timestamp (e.g., date and/or time information). In some examples, the different example data types of strings, number, timestamps, etc., may allow the data analysis service 106 to order symbols with greater efficiency. It may be appreciated that ordering the numbers as strings can produce a different result than using the actual number under alphanumeric ordering. For example, the numerical symbols shown in symbol file 204 are sorted as numbers (1, 2, 3, . . . , 9, 11), rather than as strings, which would produce (1, 11, 2, 3 . . . ).

Additionally, it may be appreciated that by storing the symbols as strings, the symbols correspond to lossless representation of the original data. For example, a timestamp may be generated in a first format (e.g., YYYY MMM DD at HH:MM:SS am/pm), but the timestamp may be saved in a second format. By storing the timestamp as a symbol of data type string, all of the information of the generated timestamp may be retained. In contrast, by storing the timestamp as a different data type (e.g., such as a number of milliseconds after an epoch), some of the original information of the first format may be lost.

As another example, information that is stored as a string can be manipulated without having to re-encode the information. For example, when a column is generated, the information stored in the column may be stored as a string type. However, after the information is stored in the column, it may be realized that the information in the column corresponds to Internet Protocol (IP) addresses. In traditional systems, a new encoding procedure would be performed to convert the information into an IP address format. However, example techniques disclosed herein enable the information (e.g., the IP addresses) to be operated on while maintaining the string type of the information, thereby maintaining the lossless representation of the original information.

Additionally, storing information as a string type may facilitate increasing commonality in the stored data. For example, a data source may include an integer "100" and an identifier "100." In some indexes, these two entries may be stored as two different entries. However, by storing the integer "100" and the identifier "100" as a string, as disclosed herein, the two entries can be collapsed into one entry when converting the data source into the converted file.

In some examples, once the symbols have been reduced and organized, the symbols may be concatenated with a delimiter. In the illustrated example of FIG. 2, the symbols in the symbol file 204 are separated by a vertical bar or pipe character "|". It may be appreciated that using the symbol delimiter to separate symbols may facilitate reducing the amount of information used to represent the symbols. For example, representing a symbol using Type, Length, Value (TLV) encoding may include one or more bytes to represent the data type of the symbol, one or more bytes to represent the length of the symbol, and N bytes to represent the actual symbol (e.g., two or more "extra" bytes to represent the actual symbol). In contrast, disclosed techniques enable representing a symbol as a string and so the symbol may be represented using N bytes to represent the actual symbol and one extra byte to represent the delimiter symbol. The symbol delimiter may be unique in the context of the symbols, and may also be reduced during the compression operation. In some examples, each symbol in the symbol file 204 as well as localities in a locality file 206 may be represented in binary format (i.e., as 0 and 1) for improved compression.

The file converter 110 may generate the locality file 206 containing each location of each symbol. The locality file 206 represents the structure of the modeled source (e.g., raw data source). As used herein, the term "position" refers to a locality within the source file (and the mirrored localities in the locality file), which is distinguished from the term "location," which refers to a locality or coordinates within the symbol file. If a symbol is in the source file 200 more than once, a new value (representing a symbol location) is added. As shown in FIG. 2, each symbol in the symbol file 204 has a corresponding location (within the symbol file). For example, the symbol "1" is located at location "01," the symbol "A" is located at location "09," and the symbol "L" is located at location "20" of the symbol file 204. The position (within the locality file 206) of a location value is a mirror of the source file 200. In other words, the locality file 206 may be similar to the source file 200 except that in place of the actual symbol, the locality file 206 has a value representing the location of a particular symbol within the symbol file 204.

For example, in the first row, first column, the locality file 206 comprises a location value "09" in place of the symbol "A" found in the corresponding position in the source file 200. In another example, in the first row, third column, the locality file 206 comprises a location value "13" in place of the "E" symbol found in the corresponding position in the source file 200. In yet another example, the locality file 206 contains two instances of the location value "05" to represent the two separate occurrences of the symbol "5" in the source file 200.

In some examples, a location value may be implemented as an integer value that is a simple index or offset relative to the symbol file 204. For example, a location value "01" represents a first-ordered position in the symbol file 204. In other examples, a location value may be coordinate values (e.g., x-y) of a symbol within structured data. In yet other examples, a location value may be an address of a symbol contained within the symbol file 204. In some examples, the location values may be fixed in size (i.e., expanded by adding prefix 0's), and/or represented in binary (0s and 1s). In some examples, using a fixed size for the location values may allow for a more efficient processing protocol because fixed size fields may have a reduced overhead. In other words, simplified math may be used to find a given symbol in a data source file.

According to an aspect, the converted file format comprised of a symbol file and a locality file may be configured to support lossless compression. That is, the original source file (e.g., the source file 200) can be recreated from the encoding in the index file (e.g., the converted index file 202). For example, to reproduce the original data source (e.g., the source file 200), the locality file 206 can be scanned, each location value may be used as a lookup index in the symbol file 204, and the location value may be replaced with the retrieved symbol.

In some examples, the analytics engine 112 may generate a manifest file 210 that contains statistics about the source file 200. For example, the analytics engine 112 may generate, for each column of data, statistics such as cardinality (count), a sum value, a minimum value, a maximum value, an average (mean), a median value, and a standard deviation ("Std"). For example, the analytics engine 112 may generate statistics for column 2 of the source file 200 indicating a count of four records (rows) having data in that column, a sum total of 20, a minimum value of 1, a maximum value of 4, an average value of 2.5, a median value of 2.5, and a standard deviation of 1.12. It may be appreciated that the analytics engine 112 may generate different statistics based on the type of data in a column. Statistics for columns containing string or text data may include text-search-related statistics, such as distance, correlation, and/or association.

Aspects of the present disclosure may store and compress data to its theoretical minimum. For example, if a data file was compressed using some standard compression tool, the resulting file may achieve the theoretical minimum associated with that particular algorithm. Unique to the example indexing techniques disclosed herein is the ability to facilitate adaptive and/or intelligent organization of the derived locality file and symbol file such that the data source can be compressed "below" the theoretical minimum even when using the same compression algorithms. Additionally, in the data analytics world, additional information may be added to facilitate performing information retrieval. In some examples, this additional information overhead can be greater than the theoretical minimum the file could achieve and, at big data scale, can be a tremendous cost. In some examples, the value of the incurred cost may be particularly dubious when cataloguing (i.e., indexing) is required to speed up ever increasing number of specific result set retrievals.

In contrast, the index aspects disclosed herein adaptively and/or algorithmically categorize all symbols of a file, unlike other formats where the categorizing may be specified either explicitly or implicitly. And as mentioned previously, indexing is costly with respects to size and time to process. Increasing the amount of indexing slows down the ingestion of a data source, and, at some point, may cause the data organization to virtually stop. The index files disclosed herein format data differently, for example, with storage format categorizing and compressing as one intrinsic act.

Figure 3:
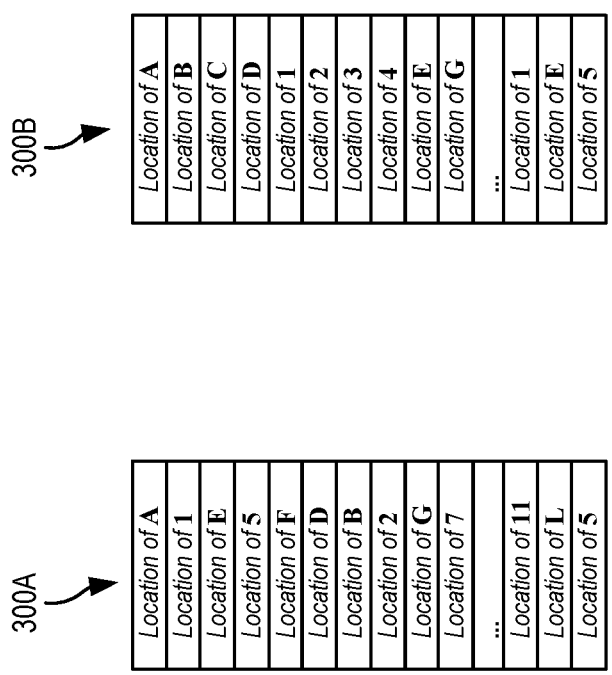
FIG. 3A depicts a representation of a locality file in a row-based orientation, in accordance with various aspects of the present disclosure.
FIG. 3B depicts a representation of a locality file in a column-based orientation, in accordance with various aspects of the present disclosure.

As described above, in some aspects, the compression algorithms may have some difficulty finding patterns when the distance of those patterns is large or disjointed. As a result, the localities in the locality file may be ordered by a row or column orientation, as shown in FIGS. 3A and 3B, respectively, or even by diagonal orientation. FIG. 3A depicts one representation of a locality file 300A in a row-based orientation. For example, the locations of symbols in the first row of the source file 200 are listed sequentially, followed by the locations of symbols in the second row of the source file 200, and so forth. In these figures and in figures to follow, the location value is represented in generic terms such as "Location of A," for clarity of illustration. FIG. 3B depicts a representation of a locality file 300B in a column-based orientation. For example, the locations of symbols in the first column of the source file 200 are listed sequentially, followed by the locations of symbols in the second column of the source file 200, and so forth.

Figure 4:
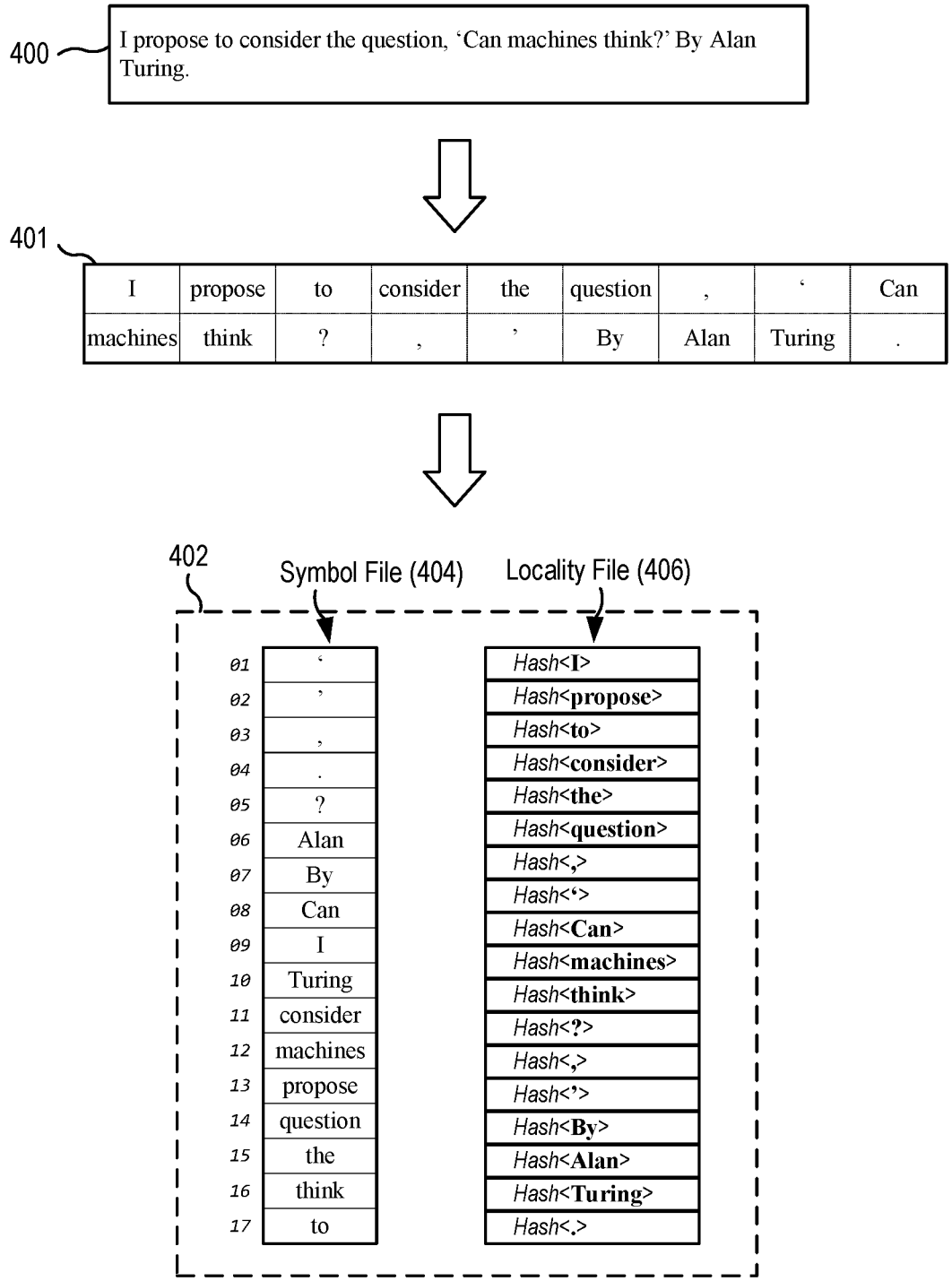
FIG. 4 is a block diagram depicting a conversion of an unstructured data source file to an index file, in accordance with various aspects of the present disclosure.

FIG. 4 is a block diagram depicting a conversion of an unstructured data source file 400 to a converted file 402 (e.g., an index file), in accordance with aspects presented herein. The source file 400 may be a document file having a plurality of text data, such as in plain text files (.txt), rich text format (.rtf), and other document file formats. As used herein, "text data" is a generalized, superset term for a data source that contains a plurality of strings, and may also contain any combination of plain (not binary) symbols such as strings, numbers, time stamps, etc. In the illustrated example of FIG. 4, the source file 400 includes a text sentence:

I propose to consider the question, 'Can machines think?' By Alan Turing.

In some examples, the example index file format may represent text sources as a continuous stream of data (e.g., left-to-right, up-to-down). It can be seen as a one-dimensional array, where numbers and words are symbols, and (most) special characters are symbols as well (e.g., one column of rows of symbols). Classical text separators, such as spaces, line breaks, tabs, and other whitespace characters, may be used as symbol delimiters. In the illustrated example, a block 401 depicts a tokenized intermediate version of the source file 400 in which the symbols have been separated by the delimiters.

In one aspect, the file converter 110 may generate a symbol file and a locality file in a manner similar to the techniques described earlier with regards to structured data. For example, the file converter 110 may create a symbol file 404 and a locality file 406 associated with the source file 400. The symbol file 404 may contain each unique symbol found in the source file 400 in a sorted order (e.g., the symbols "Alan," "By," "Can," "I," "Turing," "consider," "machines," "propose," "question," etc., as well as punctuation symbols). The file converter 110 can discard or disregard duplicate symbols (such as the second occurrence of the comma symbol ","). In the end, the symbol file 404 is a sorted array of delimited characters, and the locality file 406 provides the location of those characters in the raw data source (similar to the format of the locality file described earlier). In some cases, this representation may be the most optimal from the standpoint of compression.

Alternatively, the data analysis service 106 may use another mode of representation that allows for unique and optimal text query execution. Since text files are generally smaller than machine-generated files (such as CSV, log files, JSON, and XML, data sources), and classic text indexing technology dramatically increases the storage of raw text, this alternative mode of representation is still significantly smaller than conventional text indexing technology, such as an inverted index, as made available in the Apache Lucene software library.

As shown in FIG. 4, in one aspect, the file converter 110 may generate a locality file 406 where the locality is not the coordinates (x,y) of the location of the corresponding symbol in the source file 400, but rather a fingerprint value (e.g., hash) of the symbol itself. The position of a hash value within the locality file 406 represents the position of the corresponding symbol in the raw text source file 400. For example, the position of the hash value for the symbol "consider" in a fourth position of the locality file 406 indicates that the symbol "consider" is found in a fourth position of the source file 400. This variation of representing the locality file enables the locality file 406 to be used for text-based search without needed to refer to the symbol file 404. If the locality file 460 contains hashes of symbols (rather than their coordinates), then a symbol lookup need only analyze the locality file 406.

According to aspects disclosed herein, the mapping of hash-to-symbol can be inferred since reproduction of raw source is available by hashing symbols. Lossless compression is still supported in this variant aspect. The original raw source (e.g., the source file 400) can be recreated by hashing the symbols in the symbol file 404, and reproducing the structure of the source by matching the hashes in the locality file 406. The advantage of such hashing techniques is now the locality file 406 no longer needs to reference the symbol file 404 to answer text query operations regarding the text data. Additionally, as locality files are matrices of numbers, high performance multidimensional mathematical libraries (e.g., linear algebra operations) can be used, as well as, simple and fast bitwise operations (e.g., bit map operations). For instance, the data analysis service 106 may take a symbol or phrase of symbols, convert them into hash values, and then search/position into the matrices.

In some examples, the file converter 110 may use a hash algorithm, such as MetroHash, to generate the fingerprint value corresponding to each symbol identified in the source file 400. In some examples, the fingerprint value may have a size of 64 bits (or more) to reduce the likelihood of hash collisions. In some examples, the data analysis service 106 may further maintain a hash lookup table (e.g. hash to count) to reduce the size of locality files. It may be appreciated that all languages can be represented in the index file format. In other words, the outlined directional flow of index files is an internal representation and has no adverse effects with respect to reproduction and/or symbol search/position.

For well-formed structured data sources (e.g., CSV files) that are of basic data types (e.g. Boolean, number, string), a 2-dimensional locality model may suffice (see FIG. 2 above). However, as data sources become more complex, additional dimensions may be added. For example, the index file format may model text column sources as a new dimension per each row. The reason is that each text row column can have a different format and shape, even though conceptually it may be perceived as the same column. Text data may be thought of as an array type of symbols and, when part of a complex data source, may have their own story deserving of their own dimensionality. In other words, the change of shape may introduce a new dimension. And yet, the representation of dimensions, both in memory and on disk, is a one dimensional array, partitioned into n-number of dimensions.

One can view each one of these dimensions as a vector space, where a vector is a directional sequence of points. Thus, a locality is a data point, as part of a vector, describing a data source structure. And to reiterate, locality is what models the format and shape of a data source. Symbols, on the other hand, have no relationship to the format and shape of a data source. Symbols are typically represented as one-dimensional. However, dimensions can be introduced based on the type of symbol (e.g., Booleans, numbers, strings, and timestamps are all different vectors).

Figure 5:
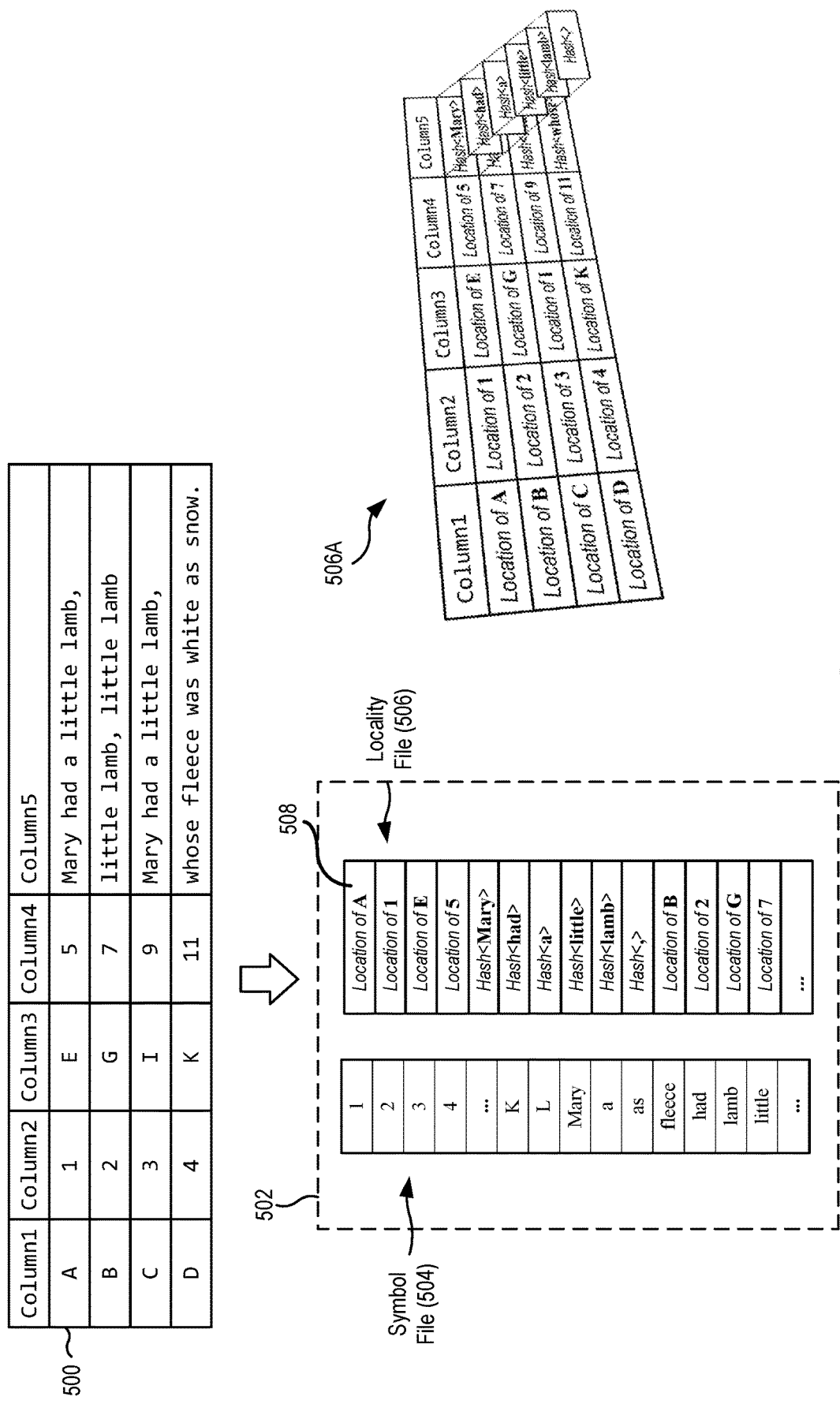
FIG. 5 is a block diagram depicting a conversion of a structured data source file having text data to an index file, in accordance with various aspects of the present disclosure.

FIG. 5 is a block diagram depicting a conversion of a structured data source file 500 having text data to a converted file 502 (e.g., an index file), in accordance with aspects presented herein. The source file 500 is similar to the example structured data source file 200 of FIG. 2, except that for the presence of a column (e.g., "Column5") of text data. In contrast to the other columns of data having simple data types (e.g., "A," "1," "E," "5"), the text column includes sequences of text (e.g., "Mary had a little lamb").

The converted file 502 for the structured data source file 500 having a text column may include a symbol file 504 and a locality file 506. The file converter 110 may create the symbol file 504 associated with the source file 500 that contains each unique symbol found in the source file 500 in a sorted order. As shown in FIG. 5, the symbol file 504 includes symbols of the basic data types found in the columns 1 to 4 (e.g., "A," "1," "E," "5"), as well as symbols parsed in the text column (e.g., "Mary," "a," "as," "fleece," "had").

The file converter 110 may further create the locality file 506 having a combination of location values indicating the location of each symbol in the symbol file 504, as well as fingerprint values of symbols from the text column. The positions of the location and fingerprint values are mirrors of the source file 500. For example, the locality file 506 contains, at a first position 508 of the locality file 506, a location value (depicted generically as "Location of A") representing where the corresponding symbol "A" can be found in the symbol file 504. In another example, the locality file 506 also contains a plurality of hash values for symbols of text data at a position within the locality file 506 corresponding to Column5. The locality file 506 for a structured data source may be modeled as a two-dimensional structure corresponding to the rows and columns of the structured data source, with the addition of a third dimension corresponding to a sequence of text data found in at least one of the cells. In other words, a CSV file can be a two-dimensional matrix where the text column can be viewed as a third dimension starting at the location of the row and column coordinates. This three-dimensional concept is depicted in the form of a locality file 506A shown in FIG. 5.

Figure 6:
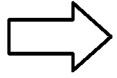
FIG. 6 is a block diagram depicting a conversion of a semi-structured data source file to an index file, in accordance with various aspects of the present disclosure.

The conversion of semi-structured data sources (e.g., JSON and XML) into an index file may follow all the same principles discussed earlier for unstructured data sources (e.g., text data) and structured data sources (e.g., CSV files, log data sources, etc.) and their combinations thereof. FIG. 6 is a block diagram depicting a conversion of a semi-structured data source file 600 to a converted file (e.g., an index file), in accordance with aspects presented herein. The example source file 600 is a JSON file having data in the form of a plurality of name-value pairs that describe an entity (e.g., a "Company X"). In the illustrated example of FIG. 6, the JSON data includes data specifying a "name" field, an "address" element (which contains name-value pairs of the address), and an "employees" field (which contains an array of employee names).

In one aspect, the semi-structured data source file 600 may be transformed into a two-dimensional representation. First, the file converter 110 may generate a flattened representation 601 of the semi-structured data of the source file 600. In some examples, the flattened representation 601 may include a plurality of columns corresponding to the keys of the JSON object, and a row of data corresponding to values of the JSON object. For example, as shown in FIG. 6, the "name" field of the source file 600 is transformed into a first "name" column in the flattened representation 601. The "address" field of the source file 600 is transformed into separate columns in the flattened representation 601, each column representing a name-value pair in the address field (e.g., "address.street," "address.city," "address.state"). The "employees" array of the source file 600 is transformed into separate columns in the flattened representation 601, each column for each element in the array (e.g., "employees[0]," "employees[1]," "employees[2]," "employees[3]").

After generating this two-dimensional structure (e.g., the flattened representation 601), the file converter 110 may proceed to generate a symbol file and a locality file associated with the semi-structured data source file 600. Similar to the earlier examples, the file converter 110 may create a symbol file associated with the semi-structured source file 600 that contains each unique symbol found in the value data of the name-value pairs of the semi-structured data, in a sorted order. The file converter 110 may further create a locality file containing the location values of the symbols in the symbol file.

It may be appreciated that both JSON and XML (by definition) cannot be malformed and would be considered invalid. These data sources are described as semi-structured. In the case of processing an invalid JSON/WL data source, the file converter 110 may model the invalid JSON/WL data source as a one-dimensional text array and can be considered unstructured (e.g., a list vector of directional symbols).

In some examples, the index representation of complex structures, such as JSON and XML, may be an extension of the same multidimensional description, constructs, and rules discussed earlier. For instance, JSON can be viewed as a human readable data format and can be viewed as an object, but without the methods. In other words, these structures can model Booleans, numbers, strings, arrays, and maps (i.e., objects), as well as any combination thereof.

In some examples including log-file data sources, there may be an underlying structure for each line of log records. For example, log files may be similar to CSV files where this underlying structure is the delimitation. As a result, indexed representation of log files can be treated similarly to the aspects described in conjunction with CSV files. When there is a line that has no discernible structure, such as a delimitation to other lines, these symbols can be viewed as text. And like CSV files with text, the index techniques may follow an identical process for representation.

Using the index file format presented herein, the file converter 110 can model these types and combinations. Types such as basic types (e.g., Boolean, number, string, and timestamp) are identified as symbols, with each having a locality of reference. An array of types is the same construction like the index text (symbols) based one-dimensional array. A map is a symbol to another dimension that can be another symbol, list, and/or map. In the case of a map, the locality is a special locality that references the symbol and another locality of reference.

It may be appreciated that most, if not all, relational analytic databases do not support text types or text search, nor do text search databases support true relational operations. The support of both relational and text queries by aspects of the present disclosure, in one technology, has significant benefits both from a cost and complexity perspective.

Another aspect of the reduction is that the index format provides the ability to partition data into manageable chunks, but logically operate on them as a whole. The index presented herein can work on data sources having a size greater than the available memory by slicing and then link/merging them into separate but connected physical representations. It should be noted that link/merging de-duplicates information across each chunk such that optimal compression is achieved across the entire data source. It should be noted that the present description is in the context of one complete representation, rather than data sources chunked-up for parallel execution, as well as, the corresponding link/merging of individual chunks. None of the representations changes at scale, just the process of "connecting" them together via the link/merge operation.

In some examples, indexing a data source may include slicing the data source into parallel workloads where symbol files, locality files, and manifest files may be created for each workload (or partition). To bring the partitions together, the data analysis service 106 may create a summary file that represents an aggregation of the different manifest files. Thus, it may be appreciated that the summary file may represent a root of a tree of partition branches (e.g., the manifest files). For example, a first manifest file may contain information relating to one column (e.g., Column A) and a second manifest may contain information relating to two columns (e.g., Columns B and C). The analytics engine 112 may create a summation file (e.g., a root) that links the two manifest files (e.g., the two branches) and contain aggregated statistics related to the three columns (e.g., Columns A, B, and C). The respective manifest files may be used to determine what information is contained in the corresponding symbol and locality file pairs (e.g., the "leaves" of the "branch" manifest file).

After data sources are indexed, it may be appreciated that the information contained in each of the different indexes may be combined and/or re-organized based on the summary files. For example, disclosed techniques may enable combining roots (e.g., summary files) from different trees to form a bigger tree. In some such examples, a new summary file may be created based on the respective roots and/or branches.

Additionally, the summary file(s) and the manifest file(s) allow the information to be shaped for efficient access. For example, a new manifest file may be generated by using a subset of columns of a current manifest file. For example, a current manifest file may contain 1000 columns, but information related to a query may be contained in two of the columns. Accordingly, examples disclosed herein enable a new manifest file to be created using the two columns of the current manifest file. That is, the manifest file describes the schema and contains the metadata for respective columns, and the summary file represents the summation of the metadata and the schema.

Thus, it may be appreciated that the schema and the structure of techniques disclosed herein are maintained separately. For example, for a B-tree index, the structure and the schema of the indexed data is the same. However, the techniques disclosed herein enable the schema and the structure to be maintained separately and to be manipulated as needed. Additionally, the example techniques disclosed herein provide schema on write-read performance with schema on read-write performance. For example, performance on write-read may be beneficial for structured databases, while schema on read-write may be beneficial for unstructured data lake platforms. Example techniques disclosed herein allow the benefits of an unstructured data lake to be realized as if the information is indexed as in a structured database. That is, indexing may be performed so fast that it may appear as if the data is not indexed at all. Additionally, the indexing performed is flexible so that data may be accesses "as you want it" without the complexity and performance hit that may be tied with a traditional structured database.

Figure 7:
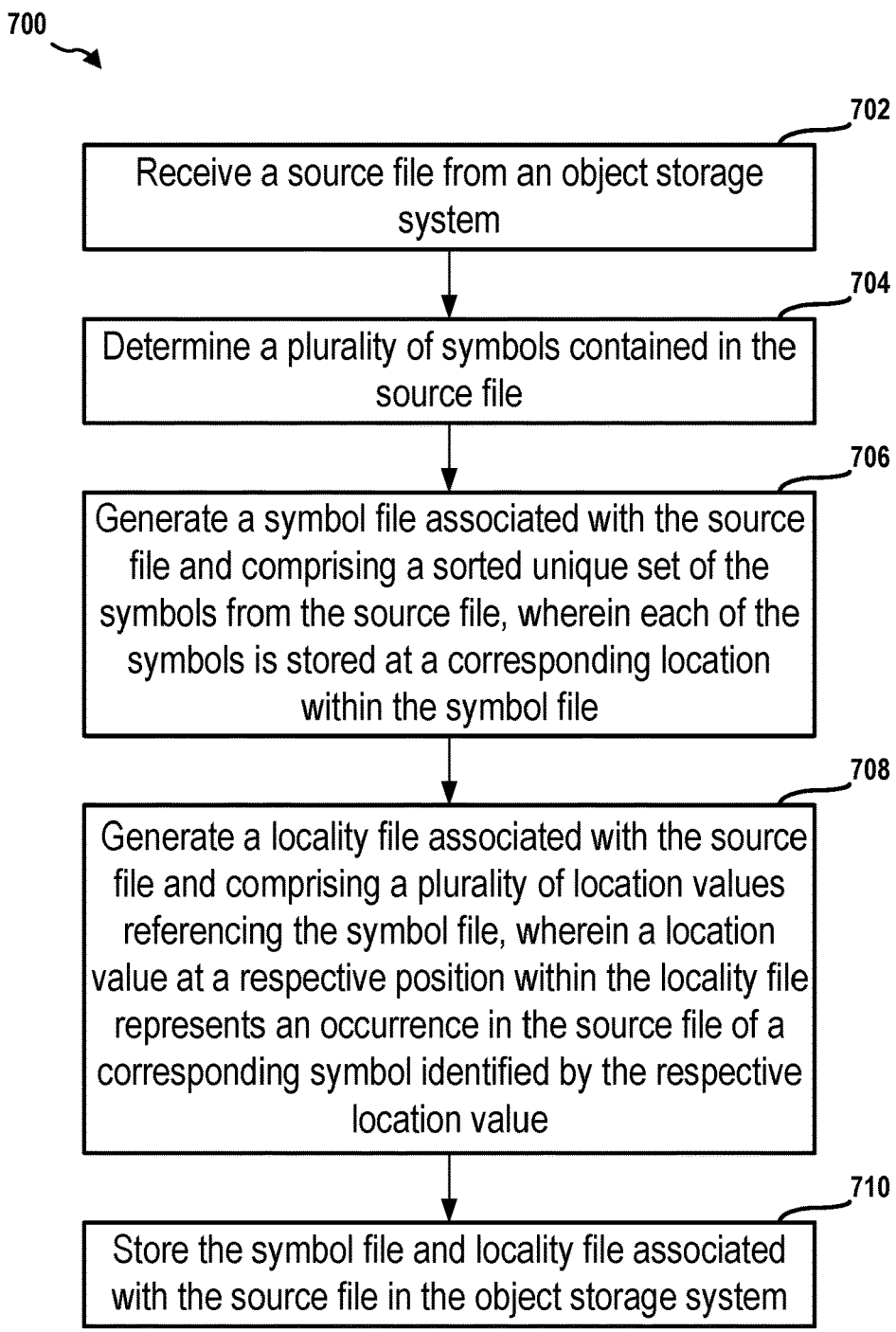
FIG. 7 is a flowchart illustrating a method for processing and storing a file in object storage, in accordance with various aspects of the present disclosure.

FIG. 7 is a flowchart illustrating a method 700 for processing and storing a file in object storage, in accordance with aspects presented herein. The method may be performed by the data analysis service 106, by a component of the data analysis service 106, such as the file converter 110 and/or the analytics engine 112, or by the object storage system 103. It is noted that the following description of the example method makes reference to the system and components described above.

At 702, the data analysis service 106 (e.g., using the file converter 110) receives, from the object storage system 103, one or more source files 115. The file converter 110 may convert the received source files 115 to an index file format to facilitate later discovery, refinement, and query operations. For example, FIG. 2 illustrates an example of conversion of a source file 200 having structured data, such as CSV files, into at least one symbol file 204 and at least one locality file 206. In another example, FIG. 4 illustrates an example of a conversion of a source file 400 having unstructured data, such as text data, into a symbol file 404 and a locality file 406. In yet another example, FIG. 5 illustrates an example of a conversion of a source file 500 having structured data with a text column into a symbol file 504 and a locality file 506 (or locality file 506A). Finally, FIG. 6 illustrates a conversion of a source file 600 having semi-structured data, such as JSON and XML, files, into a symbol file and a locality file.

At 704, the data analysis service 106 determines a plurality of symbols contained in the source file 115. For example, the file converter 110 may scan through the source file 115 to identify individual symbols contained in the source file 115 using some predetermined character(s) as delimiters between symbols (e.g., such as whitespace).

At 706, the file converter 110 generates a symbol file 122 associated with the source file 115 and comprising a sorted unique set of the symbols from the source file 115. Each of the symbols may be stored at a corresponding location within the symbol file 115. In some examples, the sorted unique set of the symbols in the symbol file 122 are concatenated together with a delimiter.

At 708, the file converter 110 generates a locality file 124 associated with the source file 115 and comprising a plurality of location values referencing the symbol file 122. A location value at a respective position within the locality file 124 represents an occurrence in the source file 115 of a corresponding symbol identified by the respective location value. In some examples, the source file 115 may comprise structured data, and the location values may be ordered within the locality file 124 by one of a row orientation or a column orientation. For example, the source file 115 may comprise at least one of a comma-separated values (CSV) file having a plurality of records, each record comprising a plurality of fields separated by a delimiter character.

In some examples, the file converter 110 may identify a type of data contained in the source file 115. For example, the file converter 110 may identify the type of data based on a file extension of the file, based on metadata associated with the file identifying the type of data, or based on an inspection of the file itself. Responsive to determining that the source file 115 comprises unstructured text data, the file converter 110 may generate a plurality of fingerprint values based on the determined plurality of symbols contained in the source file 115. The file converter 110 may then generate the locality file 124 comprising the plurality of fingerprint values. A fingerprint value based on a corresponding symbol and at a respective position within the locality file may represent an occurrence in the source file 115 of the corresponding symbol.

In another aspect, responsive to determining that the source file 115 comprises semi-structured data, the file converter 110 may transform the semi-structured data into a two-dimensional structure prior to generating the locality file 124. For example, the source file 115 comprising semi-structured data may be formatted as at least one of a JavaScript Object Notation (JSON) file and an extensible markup language (XML) file.

At step 710, the file converter 110 stores the symbol file 122 and locality file 124 associated with the source file 115 in the object storage system 103. In some aspects, the file converter 110 stores the symbol file 122 and the locality file 124 in a same bucket 108 as the source file 115 in the object storage system 103. In some aspects, the file converter 110 may generate an index file 120 that comprises the symbol file concatenated with the locality file. In some aspects, the data analysis service 106 may search the source file 115 by querying the locality file 124 associated with the source file 115.

It may be appreciated that the example method 700 of FIG. 7 for processing and storing a file in object storage enables improved compression rates of object data due to the separate of symbol and locality. As described above, by separating the source file into a symbol file and a locality file, it may become more efficient to manage data in a data store (e.g., the object storage system 103). For example, data analysis, manipulation, and/or queries can be handled without decompressing the symbol file. Additionally, modifications may be made to the locality file to update the data in the source file.

In some examples, after the file converter 110 generates the symbol file 122 and the locality file 124, the file converter 110 may select and apply one or more compression algorithms on the respective files 122, 124. For example, the file converter 110 may apply a run-length encoding (RLE) algorithm on the symbol file 122 and the locality file 124. The RLE compression algorithm is a relatively fast compression algorithm and may not be a processor intensive algorithm. While the RLE compression algorithm may not provide the best compression ratios for a source file (e.g., the source file 115), it may be appreciated that by separating the source file into the symbol file 122 and the locality file 124, the RLE compression algorithm may be applied to each of the respective files 122, 124, thereby enabling a relatively higher compression ratio due to, for example, the theoretical minimum sequence of characters in the symbol file 122 (with built-in sort) and integer base position values within the locality file 124. For example, by applying the RLE compression algorithm to the respective files 122, 124, the source file 115 may be compressed to a size with a compression ratio that is greater than or equal to compression ratios achieved by more processor intensive compression algorithms, such as entropy encoding, Huffman encoding, and/or Arithmetic encoding, which are each known for their size reduction abilities.

However, it may be appreciated that by further reducing the size of a symbol file and/or a locality file, greater compression ratios may be achieved. Aspects disclosed herein provide techniques for augmenting the symbol file and the locality file to achieve even greater reductions in size and to achieve improvements in performance while still using RLE compression algorithms to perform data compression of the respective files. Additionally, the disclosed techniques also support lossless compression. While some disclosed aspects provide techniques for improving the generating of the symbol file or the locality file, it may be appreciated that as the representation of symbols in the symbol file are reduced, the size of the locality file is also reduced due to the smaller location numbers to compress. For example, if there are three symbols in a symbol file (e.g., "A," "B," and "C"), the corresponding locality file may comprise location values of "100," "200," and "300," respectively. However, if the location values may be stored as "1," "2," and "3," respectively, the locality file may be more compressible.

Although the following description may be focused on structured data source files, the concepts described herein may be applicable to other data types, such as unstructured data, structured data with text values, and semi-structured data, as described in connection with FIGS. 2 to 6.

Figure 8:
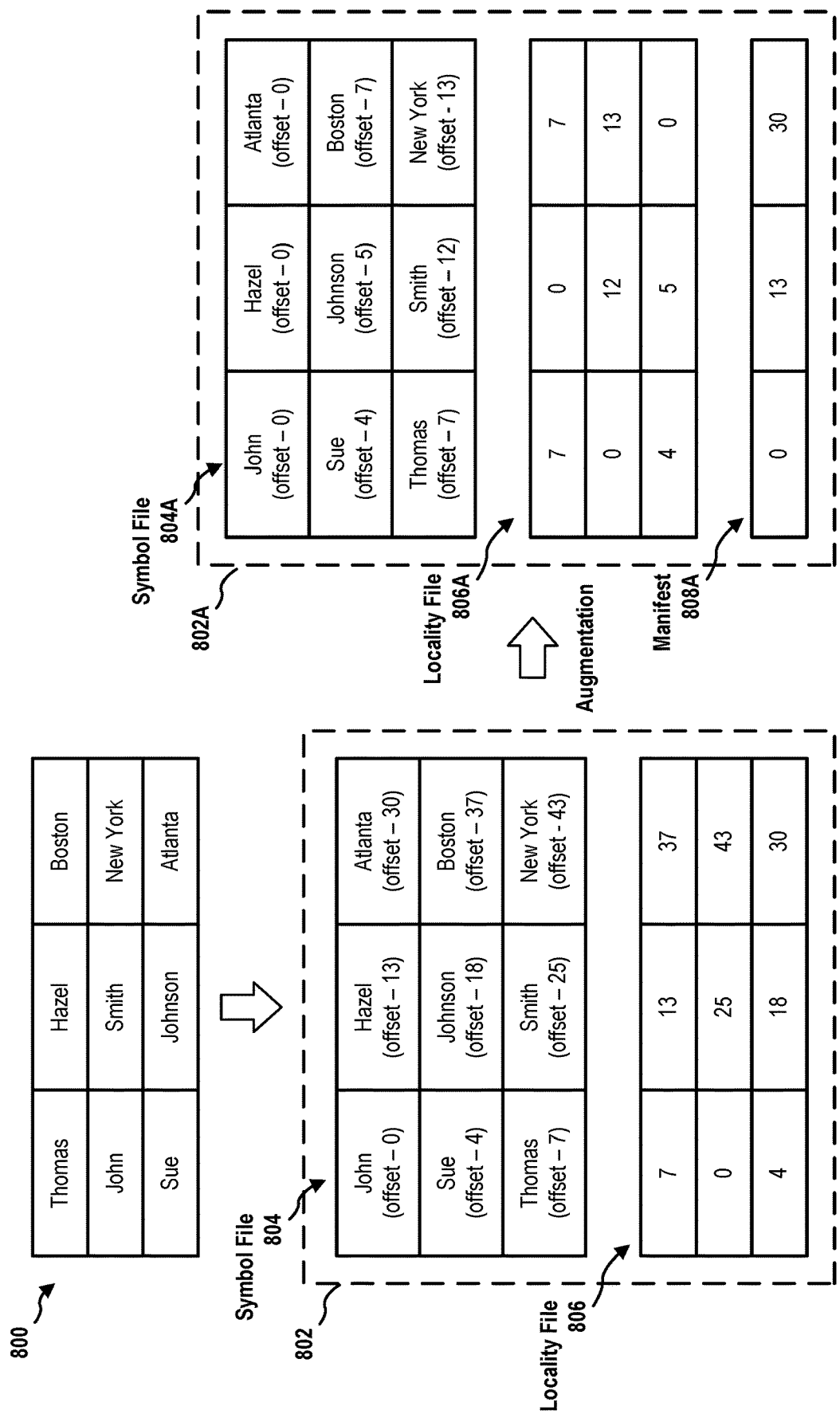
FIG. 8 is a block diagram depicting a conversion and augmentation of a structured data source file to an index file, in accordance with aspects presented herein.

FIG. 8 is a block diagram depicting a conversion and augmentation of a structured data source file 800 to a converted file 802 (e.g., an index file), in accordance with aspects presented herein. Similar to the source file 200 of FIG. 2, the source file 800 is rendered in FIG. 8 in a table format for sake of illustration, but it is understood that the structured data may be encoded in a variety of formats. For example, the source file 800 may be a delimiter-separated file (such as a CSV file) containing a plurality of records (i.e., lines), where each record is comprised fields separated by a delimiter (e.g., a comma). In another example, the structured data source file 800 may be a log file containing a plurality of log entries, for example, separated by a tab or whitespace character.

Based on the source file 800, the file converter 110 may create a converted file 802 (e.g., an index file) having a symbol file 804 and a locality file 806. The symbol file 804 may contain each symbol found in the source file 800. The file converter 110 may create the symbol file 804 so that the symbol file 804 comprises each unique symbol found in the source file 800 in a sorted order. As shown in FIG. 8, the symbol file 804 contains each unique symbol found in each respective column of the source file 800 in a sorted order. For example, the symbols of the first column of the source file 800 (e.g., "Thomas," "John," and "Sue") are sorted and stored in the symbol file 804 as "John," "Sue," and "Thomas." In a similar manner, the symbols of the second column of the source file 800 and the symbols of the third column of the source file 800 are each respectively stored in a sorted order.

In the illustrated example, each character of a symbol may be represented as a byte. Thus, the size of a symbol may vary per symbol. For example, the symbol "Thomas" may be represented as six bytes, the symbol "John" may be represented as four bytes, the symbol "Sue" may be represented as three bytes, etc.

As shown in FIG. 8, an offset position is associated with each symbol after the symbols are stored in their sorted order. For example, the symbol "John" is located at an offset position of "0" indicating a start position of a column. The symbol "Sue" is located at an offset position of "4" based on the offset position of the previous symbol (e.g., "0") and the size of the previous symbol (e.g., the four bytes associated with the symbol "John") The symbol "Thomas" is located at an offset position of "7" based on the offset position of the previous symbol (e.g., "4") and the size of the previous symbol (e.g., the three bytes associated with the symbol "Sue").

Although the symbol file 804 is depicted as a 3×3 table in FIG. 8, the location values (or offsets) may be represented in a column-based orientation (as shown in FIG. 3B). That is, while the symbol "Hazel" is depicted in the first row, second column of the symbol file 804, the symbol "Hazel" is located at an offset position "13" based on the offset position of the previous symbol (e.g., "7") and the size of the previous symbol (e.g., the six bytes associated with the symbol "Thomas"). In a similar manner, the offset positions of the remaining symbols of the symbol file 804 may be determined.

The example locality file 806 contains each location of each symbol in the source file 800. The locality file 806 represents the structure of the modeled source (e.g., the source file 800). That is, the locality file 806 may be similar to the source file 800 expect that in place of the actual symbol, the locality file 806 has a value representing the location of a particular symbol within the symbol file 804. For example, the first row, first column of the source file 800 comprises the symbol "Thomas" and the first row, first column of the locality file 806 comprises the location "7" based on the offset position "7" corresponding to the symbol "Thomas" in the symbol file 804.

As shown in FIG. 8, the offset positions in the symbol file 804 and the location values in the corresponding locality file 806 may become relatively large. For example, the symbol "New York" may be located at an offset position "43."

In one aspect, disclosed techniques may be configured to perform augmentations on the source data during conversion to the converted file by making the offset positions in the locality file in a column-based orientation. For example, the first symbol in each column in the symbol file may be located at a new offset position of "0." As a result, the offset position of symbols in subsequent rows of a column may be smaller values, resulting in a reduction of number space within the locality file. In some examples, the new offset positions may be similar to a logical value position versus a physical value position. In some examples, the physical value position may be stored in an associated manifest so that the physical value position (from the manifest) may be added to the logical value position (from the locality file) to produce the physical location in the symbol file.

For example, as shown in FIG. 8, the locality augmentation component 132 and the symbols augmentation component 134 of the compression component 130 of FIG. 1 may create an augmented converted file 802A comprising an augmented symbol file 804A, an augmented locality file 806A, and a manifest 808A. Similar to the symbol file 804, the augmented symbol file 804A contains each unique symbol found in each respective column of the source file 800 in a sorted order. In contrast to the offset positions discussed in connection with the converted file 802, the offset position of each symbol in the first row of each column of the augmented converted file 802A is depicted as starting at the new offset position of "0" (e.g., the symbols "John," "Hazel," and "Atlanta" are each located at the offset position "0"). For example, while the symbol "Hazel" is located at the offset position "13" in the locality file 806, the symbol "Hazel" is located at the offset position "0" in the augmented locality file 806A. The symbol "Johnson" is located at the offset position "5" in the augmented locality file 806A based on the offset position of the previous symbol (e.g., "0") and the size of the previous symbol (e.g., the five bytes associated with the symbol "Hazel"). The symbol "Smith" is located at the offset position "12" in the augmented locality file 806A based on the offset position of the previous symbol (e.g., "5") and the size of the previous symbol (e.g., the seven bytes associated with the symbol "Johnson").

The compression component 130 and/or the locality augmentation component 132 may also store the physical location value corresponding to the symbol in the first row of each column in the manifest 808A. As described above, the physical location value associated with a column (from the manifest 808A) and the logical location value (e.g., the offset position) in the augmented locality file 806A may be used to produce the physical location value associated with a symbol in the symbol file. For example, the symbol "Smith" is located at the physical location value "25" (as shown in the symbol file 804). To produce the physical location value "25" using the augmented converted file 802A, the physical location value "13" associated with the second column (from the manifest 808A) may be added to the logical location value "12" associated with the symbol "Smith" in the augmented symbol file 804A.

By setting the offset position to "0" for each symbol of the first row of each column, the offset positions may be reduced in number space and, thus, the size of the augmented locality file may be reduced.

In some aspects, the compression component 130 may perform the augmentations on the source data to create the augmented converted file 802A and then determine whether the converted file 802 or the augmented converted file 802A provides greater compression ratios. In some examples, the compression component 130 may maintain the respective file that provides the greater compression ratio and discard the other file. In some examples, the file converter 110 may store both respective files 802, 802A.

It may be appreciated that while the illustrated example of FIG. 8 depicts the converted files 802, 802A in a column-based store, the example index file format is not limited to a column-based store. For example, the index file format may be oriented such that organization and/or representation may be vertical like a column-based store. However, the index file format may facilitate a stream-based protocol or representation where stored data is not associated with a data structure, such as a B-tree and/or variations. By using a stream-based protocol or representation, the stored data is flexible in shape and not inflexible with respect to transforming a segment shape and/or scheme associated with the stored data.

In some examples, to further improve the compression ratio of a locality file, disclosed techniques may apply a shuffle filter algorithm on each column of the locality file before performing the RLE compression algorithm (or other compression algorithm). The shuffle filter algorithm may reduce randomness of logical values within each column of the locality file. For example, a shuffle filter algorithm may rearrange the bytes of input values in a deterministic and reversible manner to produce long runs of similar bytes that can be compressed more effectively by, for example, the RLE compression algorithm. For example, when creating a locality file, the initial location values may be input into a shuffle filter algorithm (e.g., elements in rows and bit columns) to reduce the byte randomness of the location values. When attempting to reproduce the initial location values after the shuffle filter algorithm is applied, a reverse shuffle algorithm may be applied to the shuffled location values.

Figure 9:
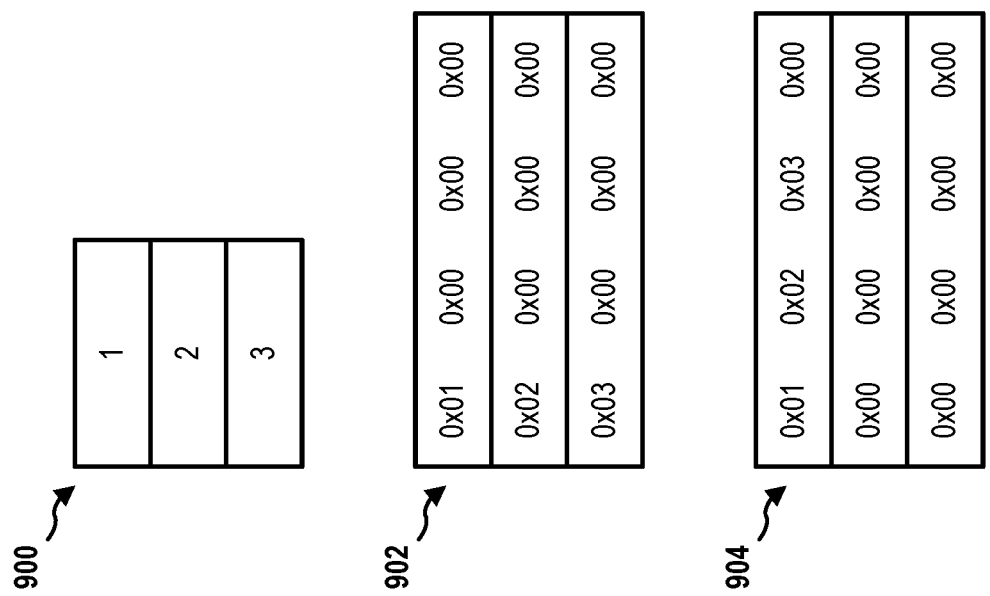
FIG. 9 is a block diagram depicting a shuffle filter algorithm applied to a locality file, in accordance with aspects presented herein.
Figure 10:
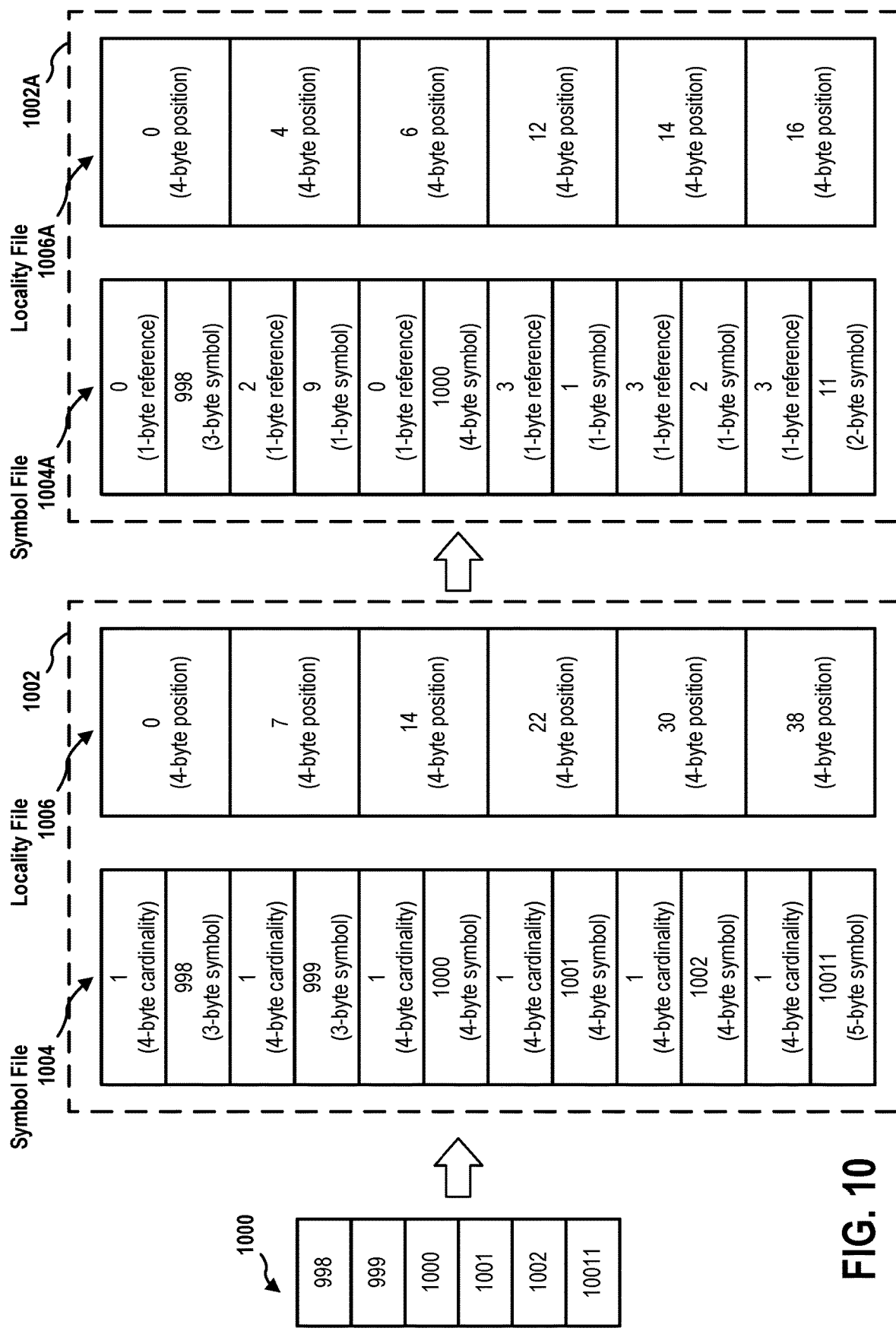
FIG. 10 is a block diagram depicting a conversion of a source file to a reference-based converted file including a reference-based symbol file and a corresponding locality file, in accordance with aspects presented herein.

For example, FIG. 9 is a block diagram depicting a shuffle filter algorithm applied to a locality file 900, in accordance with aspects presented herein. The example locality file 900 comprises a column vector including three values "1," "2," and "3." The values of the locality file 900 represent the logical values of the respective location values. In the illustrated example, each location value is represented as a four-byte value. That is, while the size of a symbol may vary (e.g., the size of the symbol "Sue" is three-bytes, the size of the symbol "Atlanta" is seven-bytes, etc.), the size of a location value is four-bytes. A block 902 represents a pre-shuffle physical byte representation of the locality file 900. For example, the logical value "1" of the locality file 900 may be represented as the physical byte representation "0x01 0x00 0x00 0x00" in the block 902, the logical value "2" of the locality file 900 may be represented as the physical byte representation "0x02 0x00 0x00 0x00" in the block 902, and the logical value "3" of the locality file 900 may be represented as the physical byte representation "0x03 0x00 0x00 0x00" in the block 902.

In an aspect, the compression component 130 and/or the locality augmentation component 132 may apply the physical byte representations into a shuffle filter algorithm to generate a block 904 depicting a shuffled physical byte representation. As shown in FIG. 9, the non-zero values are moved to the first row of the block 904, thereby producing a long run of "0x00," which may be more efficiently compressed. In some examples, the compression component 130 may apply one or more compression algorithms (e.g., the RLE compression algorithm) after performing the shuffle filter algorithm.

In some examples, disclosed techniques may facilitate reducing the number of characters used to represent a symbol. FIG. 10 is a block diagram depicting a conversion of a source file 1000 to a converted file 1002 including a symbol file 1004 and a locality file 1006, in accordance with aspects presented herein. The example source file 1000 comprises six symbols of a column vector of a data source. In the illustrated example of FIG. 10, each symbol of the source file 1000 may be represented using a cardinality (count) parameter and a symbol parameter. The cardinality parameter may be represented as a four-byte value and the size of the symbol parameter may vary based on the symbol. For example, the symbol "998" of the source file 1000 may be represented in the symbol file 1004 by the symbol parameter "998" and the cardinality parameter "1" indicating there is one occurrence of the symbol "998" in the source file 1000. The symbol "1001" of the source file 1000 may be represented in the symbol file 1004 by the symbol parameter "1001" and the cardinality parameter "1" indicating there is one occurrence of the symbol "1001" in the source file 1000.

The offset position (e.g., location value) in the locality file 1006 corresponding to each of the symbols in the symbol file 1004 may be determined based on the size of the cardinality parameter, the size of the symbol parameter of the previous symbol, and the offset position of the previous symbol. For example, the offset position of the symbol "999" (e.g., the offset position "7") may be determined based on the size of the cardinality parameter (e.g., four-bytes), the size of the symbol parameter of the previous symbol (e.g., the three-bytes associated with the symbol "998"), and the offset position of the previous symbol (e.g., the offset position "0" associated with the symbol "998"). The offset position of the symbol "1011" (e.g., the offset position "38") may be determined based on the size of the cardinality parameter (e.g., four-bytes), the size of the symbol parameter of the previous symbol (e.g., the four-bytes associated with the symbol "1002"), and the offset position of the previous symbol (e.g., the offset position "30" associated with the symbol "1002").

It may be appreciated that the combination of the cardinality parameter and the symbol parameter in the symbol file 1004 represents the symbols in the source file 1000. Thus, it may be appreciated that the combination of the cardinality parameter and the symbol parameter may function as a dictionary for identifying the corresponding symbol (e.g., there is "1" occurrence of the symbol "998" in the source file, etc.). In some examples, such dictionaries may become large in size without reducing duplication, may provide small windows for identifying duplicates (e.g., the classic distance problem), and/or may comprise a fixed tree structure to insert/find/balance the dictionary.

In some examples, to facilitate reducing the size of representing symbols in the symbol file, disclosed techniques may employ a sliding window (or dictionary) coder to represent the symbols. For example, rather than using a traditional-style dictionary (e.g., a Huffman dictionary), disclosed techniques embed information corresponding to the symbols in-line and into the streamed representation of the symbols. That is, disclosed techniques utilize a reference-based (or delta-based) representation of the symbols.

For example, as shown in FIG. 10, the compression component 130 and/or the symbols augmentation component 134 may create a reference-based converted file 1002A comprising a reference-based symbol file 1004A and a corresponding locality file 1006A. Each symbol of the source file 1000 may be represented using a reference-based parameter and a symbol parameter. For a current symbol, the reference-based parameter may indicate a level of commonality between the current symbol and the preceding symbol within the same column. For example, the value of the reference-based parameter may indicate the quantity of characters that are shared with the previous symbol starting at the first character of each symbol. For example, the value of the reference-based parameter for the symbols "18" and "19" is "1" as each symbol starts with the character "1" and the value of the reference-based parameter for the symbols "19" and "29" is "0" as each symbol starts with a different character. The symbol parameter may indicate the value(s) of the current symbol that is (are) different from the previous symbol.

For example, and with respect to the example of FIG. 10, for the symbol "998," the value of the reference-based parameter is "0" as the symbol "998" is the first symbol and, thus, shares no commonality with a previous symbol. The value of the symbol parameter is "998" as there is no commonality with a previous symbol. For the symbol "999," the value of the reference-based parameter is "2" as the symbol "999" shares the first two characters of the previous symbol "998." The value of the symbol parameter is "9" as the third character "9" is different from the third character "8" of the previous symbol "998." As another example, for the symbol "1000," the value of the reference-based parameter is "0" as the symbol "1000" and the previous symbol "998" do not share the first character. The value of the symbol parameter is "1000" as there is no commonality with the previous symbol and, thus, the value "1000" is used to reproduce the symbols "1000." As another example, for the symbol "10011," the value of the reference-based parameter is "3" as the symbol "10011" shares the first three characters of the previous symbol "1002." The value of the symbol parameter is "11" as the fourth (and fifth) character of the symbol "10011" is different than the fourth character of the previous symbol "1002."

In the illustrated example, the offset position (e.g., location value) in the locality file 1006A corresponding to the representation of the symbols in the reference-based symbol file 1004A may be determined based on the size of the reference-based parameter of the previous symbol, the size of the symbol parameter of the previous symbol, and the offset position of the previous symbol. For example, the offset position corresponding to the symbol "999" (e.g., the offset position "4") in the locality file 1006A may be determined based on the size of the reference-based parameter of the previous symbol (e.g., the one-byte associated with the size of the reference-based parameter), the size of the symbol parameter of the previous symbol (e.g., the one-byte associated with the symbol parameter value "9"), and the offset position of the previous symbol (e.g., the offset position "0" associated with the symbol "998"). The offset position of the symbol "1011" (e.g., the offset position "12") in the locality file 1006A may be determined based on the size of the reference-based parameter of the previous symbol (e.g., the one-byte associated with the size of the reference-based parameter), the size of the symbol parameter of the previous symbol (e.g., the four-bytes associated with the symbol parameter value "1000"), and the offset position of the previous symbol (e.g., the offset position "6" associated with the symbol "1000").

As shown in FIG. 10, it may be appreciated that the disclosed techniques of using a reference-based dictionary may facilitate reducing the size of representing symbols in the symbol file. For example, the offset position corresponding to the symbol "10011" in the symbol file 1004 (e.g., without employing the disclosed reference-based dictionary) is "38," while the offset position corresponding to the symbol "10011" in the reference-based symbol file 1004A is "16." Additionally, it may be appreciated that reducing the size of representing symbols in the symbol file may correspond to a smaller locality file since the offset position of symbols is smaller values and resulting in a reduction of number space within the locality file.

Figure 11:
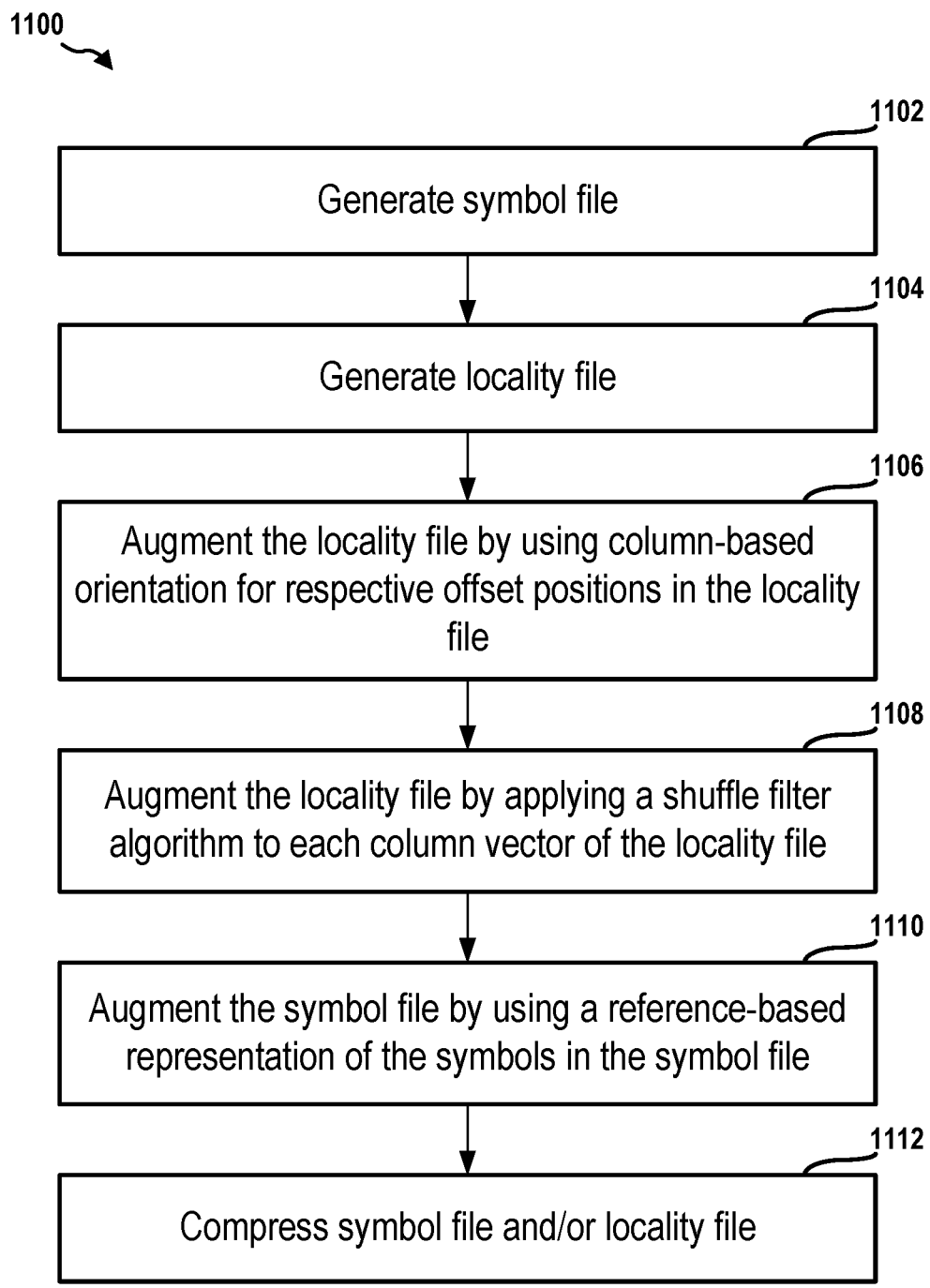
FIG. 11 is a flowchart illustrating a method for processing and compressing data, in accordance with aspects presented herein.

FIG. 11 is a flowchart illustrating a method 1100 for organizing and compressing a data file using indexing, in accordance with aspects presented herein. The method may be performed by the data analysis service 106, by a component of the data analysis service 106, such as the file converter 110, the analytics engine 112, the compression component 130, the locality augmentation component 132, and/or the symbols augmentation component 134, or by the object storage system 103. Aspects of the method may be performed by a component of the computer system 20 of FIG. 12. The components may be one or more hardware components of the computer system 20 and/or the data analysis service 106 specifically configured to carry out the stated processes/algorithm, implemented by a processor configured to perform the stated processes/algorithm, stored within a computer-readable medium for implementation by a processor, or some combination thereof. It is noted that the following description of the example method makes reference to the system and components described above. Although illustrated separately, the method of FIG. 11 may be performed in combination with the method of FIG. 7.

At 1102, a symbol file is generated based on a source file. The symbol file may comprise all of the symbols found in the source file. For example, the file converter 110 of FIG. 1 may be configured to generate the symbol file based on the source file. Aspects of generating the symbol file are described in connection with the symbols portion 122 of FIG. 1, the symbol file 204 of FIG. 2, the symbol file 404 of FIG. 4, the symbol file 504 of FIG. 5, and/or 706 of FIG. 7.

At 1104, a locality file is generated. For example, the file converter 110 of FIG. 1 may be configured to generate the locality file. The locality file may comprise the locations of all of the symbols in the symbol file. The locality file and the symbol file may be derived from the source file such that each symbol in the symbol file has at least one associated locality in locality file. Aspects of generating the locality file are described in connection with the locality portion 124, the locality file 206 of FIG. 2, the locality file 406 of FIG. 4, the locality files 506, 506A of FIG. 5, and/or 708 of FIG. 7.

At 1106, the locality file is augmented by using column-based orientation for respective offset positions in the locality file, as described in connection with the augmented converted file 802A. For example, the locality augmentation component 132 of FIG. 1 may be configured to augment the locality file by using column-based orientation for respective offset positions in the locality file. In some examples, the locality augmentation component 132 may perform augmentations on the source file by setting the location of symbol in the symbol file to a new offset position of "0." As a result, the offset position for each column is effectively reset to "0," resulting in smaller values for the offset positions in the locality file. In some examples, the locality augmentation component 132 may store the physical value position for the first symbol of each column in a manifest associated with the converted file. In some examples, the locality augmentation component 132 and/or the compression component 130 may apply a compression algorithm (e.g., an RLE conversion algorithm) to the converted file after performing the augmentations. In some examples, the locality augmentation component 132 may determine whether the compression ratio associated with the converted file or the augmented converted file is greater, maintain the file with the greater compression ratio, and discard the file with the lesser compression ratio. In some examples, the locality augmentation component 132 may store the converted file and the augmented converted file.

At 1108, the locality file is augmented by applying a shuffle filter algorithm to each column vector of the locality file, as described in connection with FIG. 9. For example, the locality augmentation component 132 of FIG. 1 may be configured to augment the locality file by applying a shuffle filter algorithm to each column vector of the locality file. In some examples, the locality augmentation component 132 may apply a shuffle filter algorithm on each column (or column vector) of the locality file. In some examples, the locality augmentation component 132 may input the physical byte representation of the logical values of the localities into a shuffle filter algorithm to generate a shuffled physical byte representation of the logical values of the localities. In some examples, the locality augmentation component 132 and/or the compression component 130 may perform a compression algorithm (e.g., an RLE compression algorithm) on the shuffled physical byte representation of the logical values of the localities.

At 1110, the symbol file is augmented by using a reference-based representation for the symbols in the symbol file, as described in connection with the reference-based converted file 1002A of FIG. 10. For example, the symbols augmentation component 134 of FIG. 1 may be configured to augment the symbol file by using a reference-based representation for the symbols in the symbol file. In some examples, the symbols augmentation component 134 may apply a sliding window (dictionary) or coder to represent the symbols in the symbol file. The sliding window dictionary may enable embedding information corresponding to the symbol in-line and into the streamed representation of the symbols. For example, the symbols augmentation component 134 may represent a symbol in the symbol file using a reference-based parameter and a symbol parameter. The reference-based parameter may indicate the quantity of characters that are shared between a current symbol and the preceding symbol starting at the first character of each symbol. The symbol parameter may indicate the value(s) of the current symbol that are different from the preceding symbol. In some examples, the symbols augmentation component 134 and/or the compression component 130 may perform a compression algorithm (e.g., an RLE compression algorithm) on the reference-based symbol file.

At 1112, a compression algorithm is used on the symbol file and/or the locality file. For example, the compression component 130 of FIG. 1 may be configured to apply a compression algorithm on the symbol file and/or the locality file. In some examples, the compression component 130 may apply an RLE compression algorithm on the symbol file and/or the locality file.

By separating the source file into a locality file and a symbol file, it may become more efficient to manage data in a data store. For example, the representation of symbols in the symbol file and/or the representation of localities in the locality file may be improved to enable greater compression ratios for one or both of the respective files. Accordingly, it may be possible to achieve compression ratios for the converted file that are greater than the compression ratios associated with applying the same compression algorithms on the source file (e.g., without separating the source file into the locality file and the symbol file).

Figure 12:
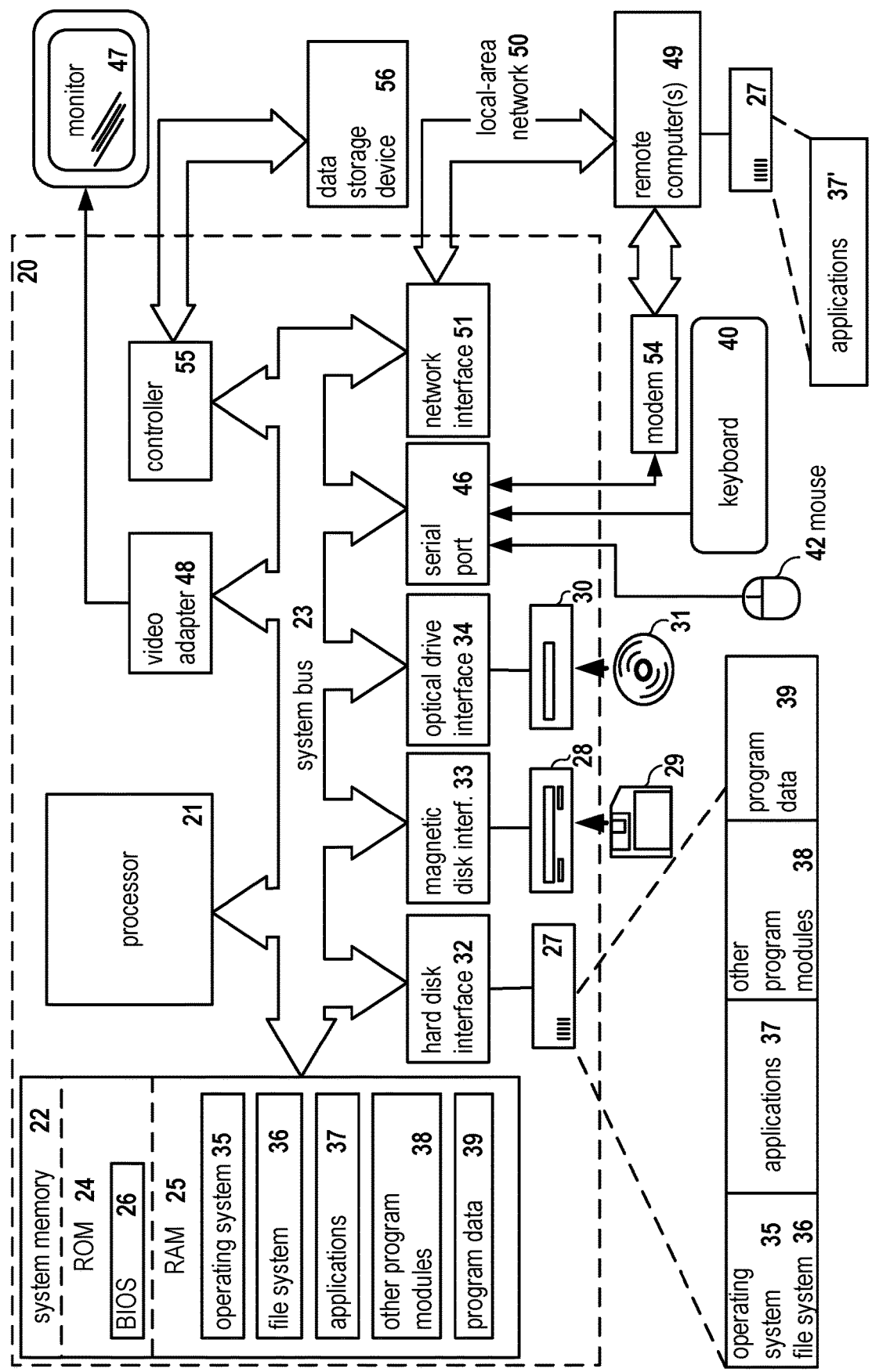
FIG. 12 is a block diagram of a general-purpose computer system on which the disclosed system and method can be implemented, in accordance with aspects presented herein.

FIG. 12 is a block diagram illustrating a general-purpose computer system 20 on which aspects of systems and methods for processing files stored in object storage systems may be implemented in accordance with an example aspect. It should be noted that the computer system 20 can correspond to the computing device 101, the object-based storage system 103, and the physical server(s) on which the data analysis service 106 is executing, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An example aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other module s well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer. Accordingly, each module may be realized in a variety of suitable configurations, and should not be limited to any particular implementation exemplified herein.

In one configuration, the data analysis service 106 and/or the computer system 20, and in particular the file system 36 and/or the processor 21, includes means for receiving, from an object storage system, a source file having data. The data analysis services 106 and/or the computer system 20 also includes means for generating a symbol file associated with the source file and comprising a sorted unique set of symbols from the source file, where each of the symbols is stored at a corresponding location with the symbol file. The data analysis services 106 and/or the computer system 20 also includes means for generating a locality file associated with the source file and comprising a plurality of location values referencing the symbol file, where a location value at a respective position within the locality file represents an occurrence in the source file of a corresponding symbol identified by the respective location value. Additionally, the data analysis services 106 and/or the computer system 20 includes means for augmenting at least one of the symbol file or the locality file, where augmenting the locating file includes reducing a representation of a location value in the locality file and augmenting the symbol file includes reducing a representation of a symbol in the symbol file.

The data analysis services 106 and/or the computer system 20 may also include means for augmenting the locality file by reducing a representation of a location value in the locality file by: using a column-based orientation for the plurality of location values in the locality file; and setting an offset position for each symbol at a first row within each column of the column-based locality file to a first value. The data analysis services 106 and/or the computer system 20 may also include means for storing the respective physical value positions within a manifest associated with the source file. The data analysis services 106 and/or the computer system 20 may also include means for determining a physical value position of a symbol within the symbol file based on an offset position in the column-based locality file corresponding to the symbol and a physical value position of a column comprising the symbol form the manifest. The data analysis services 106 and/or the computer system 20 may also include means for performing a compression algorithm on the column-based locality file. The data analysis services 106 and/or the computer system 20 may also include means for augmenting the locality file by reducing a representation of a location value in the locality file by performing a shuffle filter algorithm on physical byte representations of location values corresponding to a same column within the locality file. The data analysis services 106 and/or the computer system 20 may also include means for performing a compression algorithm on the shuffled location values of the locality file. The data analysis services 106 and/or the computer system 20 may also include means for augmenting the symbol file by reducing a representation of a symbol in the symbol file by generating a reference-based symbols file using reference-based representations of the symbols of the symbols file, where a reference-based representation of a first symbol comprises a reference-based parameter and a symbol parameter. The data analysis services 106 and/or the computer system 20 may also include means for performing a compression algorithm on the referenced-based symbols file.

The aforementioned means may be one or more of the aforementioned components of the apparatus computer system 20 and/or the data analysis service 106 configured to perform the functions recited by the aforementioned means.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for storing a file in object storage, comprising:
   receiving, from an object storage system comprising a plurality of source files, a source file having raw data;
   generating a symbol file associated with the source file, the symbol file comprising a sorted unique set of symbols from the raw data of the source file, wherein each symbol of the sorted unique set of symbols is stored at a different corresponding location of a plurality of locations within the symbol file;
   generating a locality file associated with the source file, the locality file comprising a plurality of location values referencing the plurality of locations within the symbol file, wherein a location value at a respective position within the locality file represents an occurrence in the source file of a corresponding symbol identified by a respective location value;
   storing the symbol file and the locality file associated with the source file in the object storage system, the symbol file and the locality file providing a lossless representation of the raw data of the source file;
   augmenting at least one of the symbol file or the locality file, wherein augmenting the locality file includes reducing a first representation of a corresponding location value in the locality file, and wherein augmenting the symbol file includes reducing a second representation of a symbol in the symbol file;
   receiving a search query for information included in the plurality of source files;
   querying at least one of an augmented symbol file and an augmented locality file associated with the source file based on the search query; and
   displaying a result for the search query based in part on the raw data of the source file, the result for the search query returned without accessing the source file.

2. The computer-implemented method of claim 1, wherein augmenting the locality file by reducing the first representation of the location value in the locality file comprises:
   forming a column-based locality file using a column-based orientation for the plurality of location values in the locality file; and
   setting a first respective offset position for each symbol at a first row within each column of the column-based locality file to a first value.

3. The computer-implemented method of claim 2, wherein a second respective offset position for each symbol at a second row within each column of the column-based locality file is determined based on the first respective offset position of each symbol at the first row within a same column and based on a size of the symbol at the first row within the same column.

4. The computer-implemented method of claim 2, wherein each symbol at the first row within each column of the column-based locality file is associated with a respective physical value position.

5. The computer-implemented method of claim 4, further comprising storing each respective physical value position within a manifest associated with the source file.

6. The computer-implemented method of claim 5, further comprising determining a physical value position of a first symbol within the symbol file based on a first offset position in the column-based locality file corresponding to the first symbol and a first physical value position of a column comprising the first symbol from the manifest.

7. The computer-implemented method of claim 2, further comprising performing a compression algorithm on the column-based locality file.

8. The computer-implemented method of claim 1, wherein augmenting the locality file by reducing the first representation of the location value in the locality file comprises:
   performing a shuffle filter algorithm on physical byte representations of location values corresponding to a same column within the locality file.

9. The computer-implemented method of claim 8, further comprising performing a compression algorithm on shuffled location values of the locality file.

10. The computer-implemented method of claim 1, wherein augmenting the symbol file by reducing the second representation of a first symbol in the symbol file comprises:
    generating a reference-based symbols file using reference-based representations of each symbol of the symbol file, wherein a reference-based representation of the first symbol comprises a reference-based parameter and a symbol parameter.

11. The computer-implemented method of claim 10, wherein the reference-based parameter of the first symbol indicates a level of commonality between the first symbol and a preceding symbol within a same column as the first symbol.

12. The computer-implemented method of claim 10, wherein the symbol parameter of the first symbol indicates a value of the first symbol that is different from a preceding symbol within a same column as the first symbol.

13. The computer-implemented method of claim 10, further comprising performing a compression algorithm on the reference-based symbols file.

14. A computer apparatus for storing a file in object storage, comprising:
    a memory; and
    at least one processor coupled to the memory and configured to:
       receive, from an object storage system comprising a plurality of source files, a source file having raw data;
       generate a symbol file associated with the source file, the symbol file comprising a sorted unique set of symbols from the raw data of the source file, wherein each symbol of the sorted unique set of symbols is stored at a different corresponding location of a plurality of locations within the symbol file;

generate a locality file associated with the source file, the locality file comprising a plurality of location values referencing the plurality of locations within the symbol file, wherein a location value at a respective position within the locality file represents an occurrence in the source file of a corresponding symbol identified by a respective location value;

store the symbol file and the locality file associated with the source file in the object storage system, the symbol file and the locality file providing a lossless representation of the raw data of the source file;

augment at least one of the symbol file or the locality file, wherein augmenting the locality file includes reducing a first representation of a corresponding location value in the locality file, and wherein augmenting the symbol file includes reducing a second representation of a symbol in the symbol file;

receive a search query for information included in the plurality of source files;

query at least one of an augmented symbol file and an augmented locality file associated with the source file based on the search query; and display a result for the search query based in part on the raw data of the source file, the result for the search query returned without accessing the source file.

15. The computer apparatus of claim 14, wherein the at least one processor is configured to augment the locality file by reducing the first representation of the location value in the locality file by:

forming a column-based locality file using a column-based orientation for the plurality of location values in the locality file; and setting a first respective offset position for each symbol at a first row within each column of the column-based locality file to a first value.

16. The computer apparatus of claim 14, wherein the at least one processor is configured to augment the locality file by reducing the first representation of the location value in the locality file by:

performing a shuffle filter algorithm on physical byte representations of location values corresponding to a same column within the locality file.

17. The computer apparatus of claim 16, wherein the at least one processor is configured to perform a compression algorithm on shuffled location values of the locality file.

18. The computer apparatus of claim 14, wherein the at least one processor is configured to augment the symbol file by reducing the second representation of a first symbol in the symbol file by:

generating a reference-based symbols file using reference-based representations of each symbol of the symbol file, wherein a reference-based representation of the first symbol comprises a reference-based parameter and a symbol parameter.

19. The computer apparatus of claim 18, wherein the at least one processor is configured to perform a compression algorithm on the reference-based symbols file.

20. A non-transitory computer-readable medium storing computer executable code for storing a file in object storage, the computer executable code, when executed, to cause at least one processor to:

receive, from an object storage system comprising a plurality of source files, a source file having raw data;

generate a symbol file associated with the source file, the symbol file comprising a sorted unique set of symbols from the raw data of the source file, wherein each symbol of the sorted unique set of symbols is stored at a different corresponding location of a plurality of locations within the symbol file;

generate a locality file associated with the source file, the locality file comprising a plurality of location values referencing the plurality of locations within the symbol file, wherein a location value at a respective position within the locality file represents an occurrence in the source file of a corresponding symbol identified by a respective location value;

store the symbol file and the locality file associated with the source file in the object storage system, the symbol file and the locality file providing a lossless representation of the raw data of the source file;

augment at least one of the symbol file or the locality file, wherein augmenting the locality file includes reducing a first representation of a corresponding location value in the locality file, and wherein augmenting the symbol file includes reducing a second representation of a symbol in the symbol file;

receive a search query for information included in the plurality of source files;

query at least one of an augmented symbol file and an augmented locality file associated with the source file based on the search query; and display a result for the search query based in part on the raw data of the source file, the result for the search query returned without accessing the source file.

21. The non-transitory computer-readable medium of claim 20, wherein to augment the locality file by reducing the first representation of the location value in the locality file, the computer executable code, when executed, causes the at least one processor to:

form a column-based locality file using a column-based orientation for the plurality of location values in the locality file; and set a first respective offset position for each symbol at a first row within each column of the column-based locality file to a first value.

22. The non-transitory computer-readable medium of claim 21, wherein a second respective offset position for each symbol at a second row within each column of the column-based locality file is determined based on the first respective offset position of each symbol at the first row within a same column and based on a size of the symbol at the first row within the same column.

23. The non-transitory computer-readable medium of claim 21, wherein each symbol at the first row within each column of the column-based locality file is associated with a respective physical value position.

24. The non-transitory computer-readable medium of claim 21, wherein the computer executable code, when executed, causes the at least one processor to:

perform a compression algorithm on the column-based locality file.

25. The non-transitory computer-readable medium of claim 20, wherein to augment the locality file by reducing the first representation of the location value in the locality file, the computer executable code, when executed, causes the at least one processor to:

perform a shuffle filter algorithm on physical byte representations of location values corresponding to a same column within the locality file.

26. The non-transitory computer-readable medium of claim 20, wherein to augment the symbol file by reducing the second representation of a first symbol in the symbol file, the computer executable code, when executed, causes the at least one processor to:

generate a reference-based symbols file using reference-based representations of each symbol of the symbol file, wherein a reference-based representation of the first symbol comprises a reference-based parameter and a symbol parameter.

\* \* \* \* \*